US011341163B1

(12) United States Patent
Sridharan et al.

(10) Patent No.: US 11,341,163 B1
(45) Date of Patent: May 24, 2022

(54) MULTI-LEVEL REPLICATION FILTERING FOR A DISTRIBUTED DATABASE

(71) Applicant: Amazon Technologies, Inc., Seattle, WA (US)

(72) Inventors: Shriram Sridharan, Fremont, CA (US); Eric Boutin, Bellevue, WA (US); Damien Katz, Alameda, CA (US); Kamal Kant Gupta, Belmont, CA (US); Alexandre Olegovich Verbitski, Woodinville, WA (US); Pallavi Maheshwara Kakunje, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/835,055

(22) Filed: Mar. 30, 2020

(51) Int. Cl.
*G06F 16/20* (2019.01)
*G06F 16/27* (2019.01)
(Continued)

(52) U.S. Cl.
CPC ........ *G06F 16/273* (2019.01); *G06F 11/1451* (2013.01); *G06F 11/1471* (2013.01);
(Continued)

(58) Field of Classification Search
None
See application file for complete search history.

(56) References Cited

U.S. PATENT DOCUMENTS 5,280,612 A   1/1994   Lorie et al.
5,452,445 A   9/1995   Hallmark et al.
(Continued)

FOREIGN PATENT DOCUMENTS

CA   2783370   7/2011
EP   1630674   3/2006
(Continued)

OTHER PUBLICATIONS

"Research on the Data Restoration Technology of Distributed Database System", Sep. 15, 2003, Chinese version. Retrieved from https://www.dissertationtopic.net/doc/1183968, pp. 1-17.
(Continued)

*Primary Examiner* — Belix M Ortiz Ditren
(74) *Attorney, Agent, or Firm* — Robert C. Kowert; Kowert, Hood, Munyon, Rankin & Goetzel, P.C.

(57) ABSTRACT

This application relates to multi-level replication filtering for a distributed database. A primary node of the database can generate log records that describe write requests performed to the database. The primary node can, in some embodiments, identify a portion of the data of the database that is stored at a second node, such as data stored by a read replica node that can be used in responding to read requests from clients. The primary node can select log records that are applicable to this identified portion of the data to send to the second node. Log records are not selected based on a determination that those unselected log records are not applicable to the identified portion of the data. The primary node can then send the selected log records to the second node, for the second node to apply the log records to its stored database data.

20 Claims, 9 Drawing Sheets

(51) Int. Cl.
*G06F 16/23* (2019.01)
*G06F 11/14* (2006.01)
*G06F 16/901* (2019.01)
*G06F 16/22* (2019.01)

(52) U.S. Cl.
CPC ...... *G06F 16/2237* (2019.01); *G06F 16/2365* (2019.01); *G06F 16/9017* (2019.01)

(56) References Cited

U.S. PATENT DOCUMENTS

| | | | |
|---|---|---|---|
| 5,471,614 | A | 11/1995 | Kakimoto |
| 5,524,205 | A | 6/1996 | Lomet et al. |
| 5,530,850 | A | 6/1996 | Ford et al. |
| 5,870,758 | A | 2/1999 | Bamford et al. |
| 5,907,848 | A | 5/1999 | Zaiken et al. |
| 5,951,695 | A | 9/1999 | Kolovson |
| 6,041,423 | A | 3/2000 | Tsukerman |
| 6,233,585 | B1 | 5/2001 | Gupta et al. |
| 6,240,413 | B1 | 5/2001 | Learmont |
| 6,615,219 | B1 | 9/2003 | Bruso et al. |
| 6,631,374 | B1 | 10/2003 | Klein et al. |
| 6,732,124 | B1 | 5/2004 | Koseki et al. |
| 6,732,171 | B2 | 5/2004 | Hayden |
| 6,832,229 | B2 | 12/2004 | Reed |
| 6,976,022 | B2 | 12/2005 | Vemuri et al. |
| 7,010,645 | B2 | 3/2006 | Hetzler et al. |
| 7,089,253 | B2 | 8/2006 | Hinshaw et al. |
| 7,146,386 | B2 | 12/2006 | Xiao |
| 7,266,702 | B2 | 9/2007 | Hotti |
| 7,287,034 | B2 | 10/2007 | Wong et al. |
| 7,305,386 | B2 | 12/2007 | Hinshaw et al. |
| 7,308,456 | B2 | 12/2007 | Friske et al. |
| 7,328,226 | B1 | 2/2008 | Karr et al. |
| 7,620,659 | B2 | 11/2009 | Novick et al. |
| 7,716,645 | B2 | 5/2010 | Dolby et al. |
| 7,747,663 | B2 | 6/2010 | Atkin et al. |
| 7,885,992 | B2 | 2/2011 | Pareek et al. |
| 7,930,271 | B2 | 4/2011 | Tarbell et al. |
| 7,937,551 | B2 | 5/2011 | Schott |
| 7,953,710 | B2 | 5/2011 | Novik et al. |
| 7,979,670 | B2 | 7/2011 | Saliba et al. |
| 8,086,650 | B1 | 12/2011 | Milford |
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 8,527,462 | B1 | 9/2013 | Talius et al. |
| 8,572,031 | B2 * | 10/2013 | Merriman ........... G06F 11/1458 707/613 |
| 8,909,610 | B2 | 12/2014 | Reid et al. |
| 9,026,493 | B1 | 5/2015 | Weng |
| 9,047,189 | B1 | 6/2015 | Gupta et al. |
| 9,208,032 | B1 | 12/2015 | McAlister et al. |
| 9,223,843 | B1 * | 12/2015 | Madhavarapu ....... G06F 16/273 |
| 9,251,195 | B2 | 2/2016 | Yamada |
| 9,280,591 | B1 | 3/2016 | Kharatishvili et al. |
| 9,305,056 | B1 | 4/2016 | Gupta et al. |
| 9,317,213 | B1 | 4/2016 | Gupta et al. |
| 9,460,008 | B1 | 10/2016 | Leshinsky et al. |
| 9,465,693 | B2 | 10/2016 | Gupta et al. |
| 9,501,501 | B2 | 11/2016 | Madhavarapu et al. |
| 9,507,843 | B1 | 11/2016 | Madhavarapu et al. |
| 9,514,007 | B2 | 12/2016 | Gupta et al. |
| 9,613,078 | B2 | 4/2017 | Vermeulen et al. |
| 9,665,609 | B2 | 5/2017 | Andrei et al. |
| 10,127,260 | B2 | 11/2018 | Goel et al. |
| 2002/0107835 | A1 | 8/2002 | Coram et al. |
| 2002/0143733 | A1 | 10/2002 | Mukkamalla et al. |
| 2004/0133622 | A1 | 7/2004 | Clubb et al. |
| 2004/0177100 | A1 | 9/2004 | Bjorner et al. |
| 2004/0225696 | A1 | 11/2004 | Wong et al. |
| 2004/0249869 | A1 | 12/2004 | Oksanen |
| 2006/0004885 | A1 | 1/2006 | Lubashev et al. |
| 2006/0020634 | A1 | 1/2006 | Huras et al. |
| 2006/0047626 | A1 | 3/2006 | Raheem |
| 2006/0224636 | A1 | 10/2006 | Kathuria et al. |
| 2008/0010322 | A1 | 1/2008 | Lee et al. |
| 2008/0183973 | A1 | 7/2008 | Aguilera et al. |
| 2008/0294648 | A1 | 11/2008 | Lin et al. |
| 2009/0177671 | A1 | 7/2009 | Pellegrini et al. |
| 2009/0192979 | A1 | 7/2009 | Lunde |
| 2009/0249001 | A1 | 10/2009 | Narayanan et al. |
| 2010/0036861 | A1 | 2/2010 | Srihari et al. |
| 2010/0050172 | A1 | 2/2010 | Ferris |
| 2010/0192131 | A1 | 7/2010 | Dolby et al. |
| 2010/0274750 | A1 | 10/2010 | Oltean et al. |
| 2011/0029490 | A1 | 2/2011 | Agarwal et al. |
| 2011/0035548 | A1 | 2/2011 | Kimmel et al. |
| 2011/0060724 | A1 | 3/2011 | Chan |
| 2011/0072217 | A1 | 3/2011 | Hoang et al. |
| 2011/0145201 | A1 | 6/2011 | Holst et al. |
| 2011/0161496 | A1 | 6/2011 | Nicklin |
| 2011/0251997 | A1 | 10/2011 | Wang et al. |
| 2012/0005196 | A1 | 1/2012 | Horii |
| 2012/0011106 | A1 | 1/2012 | Reid et al. |
| 2012/0041899 | A1 | 2/2012 | Greene et al. |
| 2012/0166390 | A1 | 6/2012 | Merriman et al. |
| 2012/0174112 | A1 | 7/2012 | Vaidya et al. |
| 2012/0191648 | A1 | 7/2012 | Kuber et al. |
| 2012/0259889 | A1 | 10/2012 | Dinker et al. |
| 2012/0297073 | A1 | 11/2012 | Glover et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2012/0323849 | A1 | 12/2012 | Garin, Jr. et al. |
| 2013/0036281 | A1 | 2/2013 | Revah et al. |
| 2013/0042056 | A1 | 2/2013 | Shats et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |
| 2015/0100542 | A1 | 4/2015 | Li et al. |
| 2015/0113009 | A1 | 4/2015 | Zhou et al. |
| 2015/0286701 | A1 | 10/2015 | Wideman |
| 2015/0347541 | A1 | 12/2015 | Holmes et al. |
| 2017/0083565 | A1 | 3/2017 | Gupta et al. |

FOREIGN PATENT DOCUMENTS

| | | |
|---|---|---|
| JP | H10-254748 | 9/1998 |
| JP | 2005-276094 | 10/2005 |
| JP | 2007-200182 | 8/2007 |
| JP | 2007-317017 | 12/2007 |
| JP | 2012-014502 | 1/2012 |
| JP | 2012-507072 | 3/2012 |

OTHER PUBLICATIONS

Oracle: " Triggers-Oracle Database Concepts", Retrieved from URL: https://web.archive.org/web/20150918220843/https://docs.oracle.com/cd/B19306_01/server.102/b14220/triggers.htm, retrieved on Jan. 11, 2018, pp. 1-17.
Bratko, A et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.

(56) References Cited

OTHER PUBLICATIONS

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

Jim Gray, et al., "Transaction Processing: Concepts and Techniques—Chapter 10", In: "The Morgan Kaufmann Series in data management systems", Jan. 1, 1993, pp. 529-582.

Jim Gray, et al., "Transaction Processing: Concepts and Techniques—Chapter 12", In: "The Morgan Kaufmann series in data management systems", Jan. 1, 1993, pp. 631-657.

Mokrane Bouzeghoub, et al., "A Framework for Analysis of Data Freshness", Information Quality in Information Systems, ACM, Jun. 18, 2004, pp. 59-67.

M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.

Hector Garcia-Molina, et al., "Database Systems—The Complete Book Second Edition—Chapter 18—Concurrency Control", In: "Database systems the complete book, Second Edition", Jun. 15, 2005, pp. 883-951.

Atul Adya, et al., "Efficient Optimistic Concurrency Control Using Loosely Synchronized Clocks", SIGMOD Record, ACM, vol. 24, No. 2, May 22, 1995, pp. 23-34.

"Amazon Web Services Blog" Downloaded Apr. 30, 2013 from http://aws.typepad.com/aws/2010/10/amazonrdsannouncing-read-replicas.html, Published Oct. 5, 2010 pp. 1-11.

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11g-SQL-Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/on May 14, 2013, pp. 1-4.

Julian Dyke "Result Cache Internals" Nov. 2007, pp. 1-38.

Michele Cyran et al. "Oracle Database Concepts 10g Release 2 (10.2)" Oct. 2005, pp. 1-542.

Lance Ashdown et al. "Oracle Database Concepts 11g Release 2(11.2)" Sep. 2011, pp. 1-460.

"Isolation (database systems)" downloaded from http://en.wikipedia.org/wiki/Isolation_(database_systems) on May 15, 2013, pp. 1-7.

Latika C. Savade, et al., "A Technique to Search Log Records using System of Linear Equations", Software Engineering (CONSEG), 2012 CSI Sixth International Conference, IEEE, Sep. 5, 2012, pp. 1-4.

U.S. Appl. No. 15/926,983, filed Mar. 20, 2018, Xiaofeng Bao et al.

U.S. Appl. No. 16/586,235, filed Sep. 27, 2019, Tengiz Kharatishvili et al.

U.S. Appl. No. 16/586,355, filed Sep. 27, 2019, Tengiz Kharatishvili et al.

U.S. Appl. No. 16/586,497, filed Sep. 27, 2019, Justin Levandoski et al.

U.S. Appl. No. 16/586,563, filed Sep. 27, 2019, Tengiz Kharatishvili et al.

* cited by examiner

MULTI-LEVEL REPLICATION FILTERING FOR A DISTRIBUTED DATABASE

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. In addition to the multiple different processes to perform writes, a database hosted at a distributed system or application can also allow multiple different processes implemented at separate computer systems to read from the database. With multiple readers that can read from the database, and even a single writer writing to the database, the database must implement a distributed concurrency technique to ensure that writes are consistently performed across the distributed system, and that the readers are reading consistent data from the database that is not stale. However, sending the entire log of changes for the database to all the different processes implemented at the separate computer systems that perform reads and/or writes can consume great amounts of network bandwidth and/or cause the separate computer systems to incur processing resources to determine if each change is applicable to the individual computer system. Techniques are needed to filter changes to a database across the multiple different reading and/or writing processes implemented at the separate computer systems.

Figure 1:
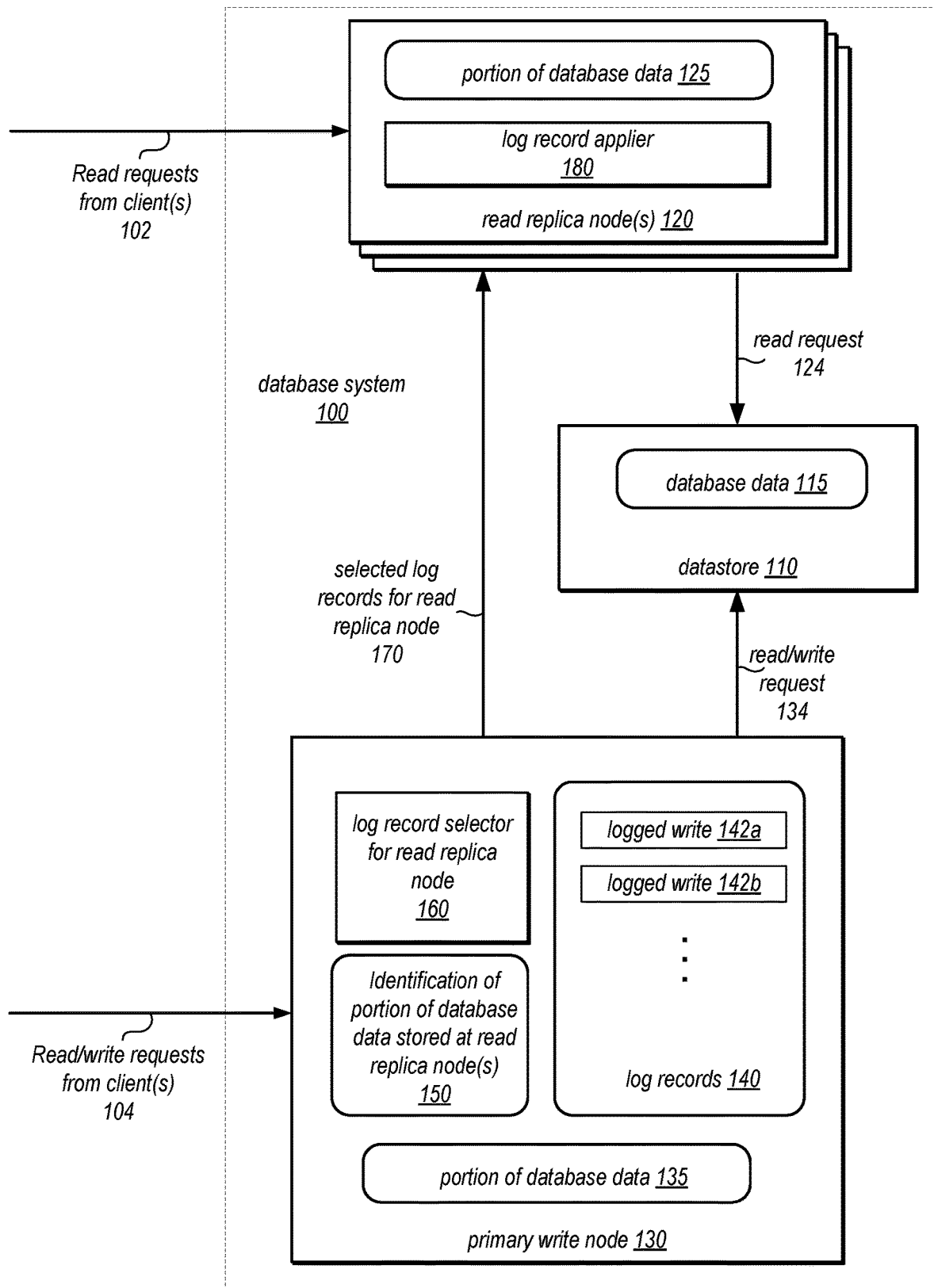
FIG. 1 is a logical block diagram illustrating multi-level replication filtering for a distributed database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of multi-level replication filtering for a distributed database are described herein. For example, in a distributed database, a primary node of the database can, in some embodiments, generate log records that describe write requests performed to the database. The primary node can, in some embodiments, identify a portion of the data of the database that is stored at a read replica node. This data can be used by the read replica node in responding to read requests from clients. The primary node can select log records that are applicable to this identified portion of the data to send to the read replica node. Log records might not be selected based on a determination that those unselected log records are not applicable to the identified portion of the data. The primary node can then send the selected log records to the read replica node, for the read replica node to apply the log records to its stored database data.

Some distributed database systems can have primary nodes with distributed storage mechanism operating in conjunction with the primary nodes to store the data of the database. These distributed database systems can implement various mechanisms to keep the data in the various nodes consistent with each other, as well as current with the latest data. Some distributed database systems can implement binary log or "binlog" replication. With binary log replication, a primary node of the database (i.e. the source of the database changes) can write updates and changes as "events" to a binary log. The information in the binary log can be stored in different logging formats according to the database changes being recorded. Secondary nodes can be configured to read the binary log from the primary node and to execute the events in the binary log on the secondary node's local database. Each secondary node receives a copy of the entire contents of the binary log. It is the responsibility of the secondary node to execute the statements in the binary log on the data of the secondary node. This can be a logical replication.

In some distributed database systems, storage can be shared between various nodes operate in conjunction with a distributed storage mechanism to store the data of the database. Some of these distributed database systems can have a shared disk architecture. Further, some distributed database systems might implement a cache or buffer pool on nodes of the database. This cache can be the pages that are being, or have been recently, read from or written to by the head node.

It might be the responsibility of a replication system to keep these caches up to date, so that consistency is maintained between nodes of the database, including any replicas. Replication can be accomplished by physical replication, such as communicating log records to both storage and to the nodes of the database, including any replicas. For example, a distributed database engine might produce a write-ahead log that is sent to (a) storage nodes to bring durable database pages up to date and (2) read replicas to update pages that are cached in the buffer pool of the read replicas. As a further example, a distributed database might support up to 15 read replicas, meaning that in addition to sending a log to any storage nodes, a writer might also need to replicate the log to the 15 other read replica machines.

There can be multiple variations of this replication depending on, for example, the configuration of the distributed database. There can be a single writer node and multiple read replica nodes, in some embodiments. The writer node can write to storage and the read replicas can read from storage. In other embodiments, there can be multiple writer nodes and multiple reader nodes into the same shared underlying distributed storage mechanism. There can also be other configurations of a distributed database depending on the embodiments, and the descriptions provided here should not be construed as limiting.

Multiple writer nodes in a database can, of course, have many advantages, in some embodiments. Allowing multiple active writers to a database may provide write scale-out support which may be useful to achieve both higher performance and high availability for a database, in some embodiments. For example, multiple writers may increase the number of clients that can perform writes to database, which would make the database more available to clients with a desire to perform writes to the database, in some embodiments. In another example, allowing multiple writers to a database may increase the speed at which individual write requests are performed as a greater number of computing resources (e.g., different servers or hosts for different writers) may be available to process write requests, in some embodiments. Allowing multiple active writers may also improve the performance of various kinds of applications that rely upon the database, in some embodiments. Analytics pipelines, for instance, may be able to avoid sharding by consolidating data into a single database that allows for multiple writers, avoiding synchronization concerns that would otherwise occur in sharded arrangements of data, in some embodiments.

In some embodiments of multi-writer distributed databases, writes to a database from multiple writers will succeed unless a conflict is detected at a log-based data store for the database. Because the log-based data store can determine, infer, or impose a logical ordering on writes to a database so that that writes from different writers are preserved in the log without overwriting one another, conflicts can be detected at the log-based data store, in some embodiments. The log-based data store can indicate, notify, or otherwise signal conflicting writes to database writers, in some embodiments. For those writes that do not conflict, the writers can proceed without further concurrency or resolution techniques, in some embodiments. In scenarios where a conflict is detected, the conflict can be resolved between the two writers that received the indication of the conflict by appealing or otherwise requesting a resolution from a primary write node for the database, in some embodiments. For example, a primary write node can evaluate transaction information, make a random selection, or perform other conflict resolution schemes. A resolution may be provided to the writers so that the successful writer can request the data store to commit their write instead of the other write, in some embodiments. In this way, writes to the database can be optimistically performed, allowing non-conflicting to proceed quickly, in some embodiments.

The more nodes, such as read replicas or writer nodes, that a distributed database has, however, the greater the replication factor to replicate the data of the database to all the different nodes. The number of log records needed to be sent within the distributed database will increase linearly with the number of replicas in the database, such as read replicas. However, the number of log records needed to be sent within the distributed database will increase exponentially as the number of writers increases. This is because log records not only need to be sent to every read replica, but the log records need to be sent to every other writer as well. As the write performance increases, or as the number of writer nodes increases, this replication factor may cause the writer or writers to bottleneck on network bandwidth, in some embodiments. Very soon the amount of network bandwidth can be exhausted, and performance and availability will both suffer. This is because a distributed database usually has a scarcity of network bandwidth.

While a distributed database, such as a distributed database operating in a provider network, might have an abundance of some resources, such as processors, memory, and storage, such that when new resources are needed they can be provisioned, the one resource which is scarce (even in provider networks) is network capacity. Most distributed databases operate in networks, such as provider networks, that operate on commodity network hardware that provides standard network speeds and capacity. As new resources are provisioned to accommodate a distributed database, the network capacity can remain scarce. The scarcity of network capacity is especially true when nodes of a distributed database operate in multiple availability zones, such as in different geographic locations at least several miles apart, for example. Communication between these availability zones is limited, and cannot be scaled up as the database increases in size.

The current path of a distributed database's ability to scale resources such as processor speed, storage, and memory versus the improvements of network capacity means that this problem will more than likely exist for the foreseeable future. This problem is likely to exist 5, 10, and 20 years into the future, if not more. For example, the amount of network throughput between remote availability zones is currently is in the range of 10-20 GB per second. This network throughput capacity is not likely to change drastically in the foreseeable future. There no advances in networking technology coming in the foreseeable future that will dramatically increase network throughput much beyond the current limitations. However, even if network throughput were to increase dramatically, it would probably be accompanied by corresponding increases in the other resources, such that network capacity remains the scarce resource. Therefore, this problem is very likely to exist many years into the future, and more than likely will not be overcome by advances in the current state of networking technology.

Distributed databases that support multiple writers exacerbate this network bandwidth bottleneck due to horizontal write scaling. When a distributed database bottlenecks on network bandwidth, this can cause replication to lag behind, in some embodiments, which in turn can cause storage nodes to run out of memory. This is because, in some embodiments, storage nodes have to keep the log records in-memory until replication catches up. When storage nodes run out of memory, this in-turn causes significant loss in performance. Therefore, solutions to address the problem of network scarcity for distributed databases, such as distributed databases operating over a wide area network using commodity network hardware, is needed.

In some embodiments of distributed databases, the database must send the entire log to shared storage since it maintains the entire set of durable data pages. In addition, in some embodiments of a distributed database, the database also sends the entire log to each writer and/or replica node of the distributed database. However, in some of these embodiments, each writer/replica node of the distributed database maintains a buffer pool, or a cache, of only a subset of pages, which are the most recently used set of pages that can fit into memory on the database node. Log records, such as write-ahead log records ("WAL"), that are received by each replica are applied to the corresponding page in the cache to keep the cache in a consistent state with shared storage. However, if the page is not in cache of a particular node, then the log record, such as the WAL record, is simply discarded. This means that while the shared storage needs to receive all the log records regarding all the write nodes for durability, the cache of the other nodes, such as the read replica nodes or the write nodes, only need the subset of log records generated by the writer(s) which are present in its cache. Developing on this observation, some embodiments of multi-level replication filtering for a distributed database filter out log records from the writer or writers (i.e., do not send them over the network) for pages that are not needed in the cache of other nodes.

There are many ways in which multi-level replication filtering for a distributed database can be implemented, depending on the embodiment. In some embodiments, log records can be sent from a writer node(s) to read replica nodes, and the read record nodes can apply these log records to its buffer cache. A buffer cache can be, for example, a set of pages of the database's data that are cached from the storage entities, such as the distributed storage system, at a particular node of the distributed database, such as the read replica node or writer node.

In some embodiments, a writer node or nodes can know what set of pages are present in one or more of the read replicas. For example, the database system might consistently maintain the state for the set of pages in each node's cache. Some of the nodes, such as the read replicas nodes, might send updates of what pages are present in their cache to other nodes, such as one or more writer nodes, or a primary node, or a primary writer node. This information can be sent between the nodes by piggybacking on other messages, such as empty replication requests, in some embodiments. The information can be relayed to a writer(s) responsible for sending the appropriate log records out, in some embodiments. The information might be sent on startup, and updated periodically, depending on the embodiment. For example, a read replica might send out the list of pages that it has in its cache initially at startup, and then can keep those pages updated going forward.

Then when a write node, or a primary node, or a primary write node receives this information, it only needs to send records regarding the pages which a node retains in its cache. The writer and/or primary node can, in some embodiments, filter the log records from the stream based on the maintained state for the individual nodes, such as the read replica nodes. The writer and/or primary removes those log records from the stream of log records, such as a WAL, to be sent to the other nodes. A node (such as a read replica node) receiving log records would then only apply the filtered log records it receives to the data in its cache, such as its buffer cache. A node would probably not receive log records that do not apply to its cache, in some of these embodiments, and therefore extraneous log records do not need to consume unnecessary network bandwidth. This can happen asynchronously in the background, in some embodiments, so that the writer and/or primary changes the set of pages that it sends to the read replicas based on the updates from the read replicas.

In some embodiments, the information regarding the pages in a read replica's cache can be encoded in a bitmap. This bitmap might have one bit that represents a page of the database, for example, such that the entirety of bits of the bitmap represents the entirety of pages of the database. This bitmap can be compressed, or treated as a sparsely populated data structure, using appropriate algorithms and techniques for those data structures, depending on the embodiment. The information regarding the pages in a node's cache might be represented using different mechanisms than a bitmap, and the description of a bitmap is not intended to be limiting. The entire encoding, such as the entire bitmap, can be relayed once upon node startup, or near in time to node startup, in some embodiments. The encoding, such as the bitmap, can be kept updated, in some embodiments. For example, the encoding on a writer node or a primary node, such as a uber-master ("UM") node, can be updated when a new page is read or evicted from the cache of one of the other nodes, in some embodiments. This can be performed in an asynchronous manner, in some of these embodiments. The updated information can piggy backed on a replication-read-request to the writer and/or the primary node, for example.

Only sending log records to nodes for pages which the stored state of a writer and/or primary node indicates is in that particular node's cache, however, might lead to consistency problems, in some embodiments. For example, there can be races between a read replica loading a page and a write and/or primary node not sending log records to the read replica for that page. The write and primary node might think that the particular read replica does not have a particular page, and therefore will not send a log record for that particular page to that particular read replica, in this example. In the meanwhile, the particular read replica might load that particular page from storage, and start accessing the data from that page. The read replica would never know about the log record to be applied to that page, and so would never apply that log record to its loaded page, and therefore the read replica would have inconsistent data, causing and inconsistency throughout the entire distributed database.

In order to solve this problem and maintain consistency across the nodes of a distributed database, including the read replica nodes, a writer and/or primary node can send invalidation log record to the other nodes, in some embodiments. The writer and/or primary node still adds an invalidation record in-place of the filtered log record to the stream. The invalidation record is a special log record that does not have the entirety of the information about the set of changes that are to be applied to a particular page. Instead, the invalidation record, in some embodiments, simply tells whether a page is to be invalided or not, only contains the page to invalidate, and is therefore a couple of times smaller in size compared to the actual log record. An invalidation can essentially means an eviction of the page from the buffer pool of the node that receives the invalidation record, in some embodiments. This invalidation record is required, in some embodiments, to prevent race conditions when the replica node reads the page from shared storage into cache while the writer is filtering out the log records. While the above implementation saves on the network bandwidth, the downside is that it sends many invalidation log records which need to be processed by the other nodes, such as by a replication applicator in other nodes. In other embodiments, an invalidation record might not be sent in order to trade off better performance for consistency.

In addition to page level filtering, multi-level replication filtering for a distributed database can utilize other types of filtering, depending on the embodiment. For example, if a distributed database comprises multiple database instances with a multi-writer system, there can be a number of possible scenarios. In one scenario, the workloads on each of the writers are independent, such that no data is shared between the writers. In this scenario, there is no reason to perform replication at all, and no reason for replication traffic to consume any of the network bandwidth. In this scenario, there can be higher performance, since no replication data is needed to be sent over the link between the two instances. In a second scenario, the same data might be modified all the time by the different database instances. This can be viewed as the opposite extreme of the first scenario. In this second scenario, both nodes can write to the same data set. This second scenario requires replication, in some embodiments, since the multiple instances are writing and/or reading the same page from storage. The page (or pages) that is constantly being accessed need to be replicated across the various instances, in these embodiments.

A third, and probably more common scenario, is when some of the data is shared between multiple instances, and some of the data is not shared. The system can discover the data that is shared and the data that is not shared, in some embodiments. Replication can occur at several levels for the data that is shared, in these embodiments. Page-level filtering can be implemented, in some embodiments, where each node asynchronously discovers the state of the other nodes' buffer cache, and a node only sends the log records that are required. However, since any node doesn't know exactly the state of another nodes buffer cache, nodes still need to send cache invalidation just in case the other nodes have a given page in their buffer cache.

In addition to, or instead of, page-level filtering, database object-level filtering can be implemented, in some embodiments. A database object can be, for example, user data, or application data, or database metadata, or data descriptive of the workings of the database system such as undo logs or database dictionaries. In some preferred embodiments, a database object can be a table or a partition of a table. If the nodes of a distributed database never actually access the same database object of a distributed database, then there is no reason to send anything from the database object at all, in some embodiments. Database object-level filtering can prevent the sending of many unnecessary invalidation log records which would have needed to be processed by the other nodes, such as by the replication applicator in other nodes. Database object-level filtering can build from page-level filtering and can filter any log record, and even any invalidation record, for any database objects that the replica node does not have in its cache, in some embodiments. In other embodiments, database object-level filtering might be implemented without page-level filtering in order to filter log records for any database objects that a replica node does not have in its cache.

Database object-level filtering can be implemented in various ways, depending on the embodiments. In some embodiments, database object-level filtering can be implemented synchronously. A writer and/or primary node can maintain the state of which database objects are open in which nodes, in some embodiments. Each node needs to synchronously register with the writer or primary node and wait for its response before the database object can be opened, in some of these embodiments. The writer and/or primary node only sends log records for those pages which belong to open database objects in the other node, in these embodiments. In these embodiments, network bandwidth can be saved, but at cost of slower performance for opening a database object (since it involves a network round-trip).

More specifically, when a node wants to open a database object, a node has to register the opening of a database object with a globally present registry, in some embodiments. The registry can keep the state of what database objects are open in what nodes, in some of these embodiments. The node that opens the database object then waits for a response from the registry acknowledging that the database object is open, in some embodiments. In some embodiments, the node might receive a log sequence number ("LSN") from which the database object is ready to be opened. The LSN can be a point in a stream that is being sent from the writer or primary node to the replica, in some embodiments. The node opening a database object should wait until it receives the LSN before it can open the database object for accesses, in some of these embodiments.

The node that sends the log records, whether it be a writer node or a primary node or a primary writer node, then can access the registry and see what database objects are open in a particular node, in some embodiments. This sending node can access the LSN for a particular database object and know that log records regarding the database object, with an LSN after the accessed LSN from the registry, need to be sent to the particular node or nodes that have that database object opened. Therefore, log records are sent to node that has the database object opened as of the LSN in which the database object was opened, in some of these embodiments. The node with the database object opened doesn't actually access the database object until it has received the LSN from the registry, making the database object accesses consistent.

Database object-level filtering can also be implemented differently, depending on the embodiments. For example, in some embodiments, each node can maintain synchronously the set of database objects that are currently open. The writer and/or primary node still sends the log records to all other nodes, in these embodiments. Each node can then decide to completely discard log records belonging to a database object-space that is not currently opened, without the costly operation (at scale) of checking if the page is present in the node's cache, in some of these embodiments. In other words, the node can completely discard all log records for database objects that are not present in its cache, without further computational analysis (such as determining whether the particular page is in the node's cache), in these embodiments. This approach does not save on network bandwidth, but does save on checking presence of the page in the buffer pool and application of log records.

In some embodiments of database object-level filtering, invalidation records to invalidate the pages belonging to the database object being filtered from the cache still need to be sent. If these invalidation records are not sent, this produces a risk of accessing stale pages once the database object is closed and re-opened. To avoid the inconsistency of accessing stale pages, pages should be continuously and asynchronously invalidated for which there are log records out of band from the replication thread, in some of these embodiments.

FIG. 1 is a logical block diagram illustrating multi-level replication filtering for a distributed database, according to some embodiments. FIG. 1 comprises a datastore 110, read replica node(s) 120, and a primary write node 130 all part of a database system 100. The read replica node 120 receives read requests 102 from one or more client(s), while the primary write node 130 can receive both read and/or write requests 104 from one or more client(s). The datastore 110 includes database data 115, while the primary write node 130 and read replica node(s) 120 both comprise a portion of the database data (135 and 125 respectively). Database data 115 may store data on behalf of a database, in some embodiments, while portion of database data 125 and 135 stores a portion of the database data. The read replica node(s) 120 can send read requests 124 to the datastore 110 to receive data which it then stories in its portion of database data 125. The primary write node 130 can also send read requests 134 to the datastore 110 to receive data which it then stories in its portion of database data 135, in addition to write requests 134 to modify the data.

Each of the database data (115, 125, and 135) can implement both a change log to data, such as log 140, and underlying storage for pages, blocks, or other locations storing database data, in some embodiments. Log 140 may, for example, store records, indications, or other entries that describe changes to the database, by describing changes to pages, blocks, or other locations, in some embodiments (e.g., as discussed below with regard to the separate data storage service in FIGS. 2-4 below or other log-based file systems or stores that log changes to data stored on behalf of an application, such as a database). For example, as illustrated in FIG. 1, log 140 may include multiple logged writes to the database, such as logged writes 142a and 142b, in some embodiments. Whenever the primary write node 130 writes to the database, in some embodiments, it modifies its portion of database data 135, it created a logged write 142 which it stores in its log records 140, and it submits a write request 134 to the datastore 110. Logged writes 142 may be records or other indications which may identify the data page, for example, to which the write is directed. Note that in some embodiments the data page, block, or other location in storage may store multiple different items, records, objects or entries of a database (e.g., multiple rows) and thus a logged write may be a write to one or some of the items, but not all items, in some embodiments. Physical conflicts that are indicated by a write to the same storage location may not incur a logical conflict and thus may allow scenarios where conflicting writes can proceed, in some embodiments.

In some embodiments of database system 100. at least some data is shared between the primary write node 130 and the read replica node 120 such that at least some of the data of the database overlaps in both their respective portions of database data (135 and 125 respectively). In some of these embodiments, some of the data may not be shared between the primary write node 130 and the read replica node 120.

The system can discover the data that is shared and the data that is not shared, in some embodiments. For example, the primary write node 130 also includes an identification of a portion of the database stored at the read replica node(s) 150. This identification 150 might be a bitmap, in some embodiments, that maps what data of the database data is stored in the read replica node's portion of database data 125. This identification 150 can be based on information received from the read replica node(s) 120 regarding the data that is stored in its portion of database data 125. In some embodiments, the primary write node 130 asynchronously discovers the state of the portion of database data 125 at the read replica node(s) 120, and the primary write node 130 only sends the log records 140, such as logged writes 142, that are required.

The primary write node 130 also includes a log record selector for the read replica node 160 which can use the identification of the portion of the database stored at the read replica node(s) 150, in some embodiments. The log record selector for the read replica node 160 can select log records 140, such as one or more logged writes 142, that are appropriate for the read replica node 120. The primary write node 130 can send the selected log records for the read replica node(s) 170 to the appropriate read replica node(s) 120, in some embodiments. If the database system 100 comprises more than one read replica node 120, then the primary write node 130 can send log records 170 that are appropriate to each individual read replica node 120. The log records sent 170 to one read replica node might be different than the log records sent 170 to another read replica node, in some embodiments.

The read replica node(s) 120 receive the selected log records for the read replica node 170, and modifies its portion of database data 125 based on the received log records, in some embodiments. The log record applier 180 can apply the selected log records received 170 to the portion of the database data 125 for the read replica node 120. For example, one or more logged writes 142 received by the read replica node(s) 120 can be applied to the portion of the database data 125 by the log record applier 180. Logged writes 142 may be records or other indications which may identify the data page, for example, to which the write is directed. Note that in some embodiments the data page, block, or other location in storage at the portion of database data 125 may store multiple different items, records, objects or entries of a database (e.g., multiple rows) and thus a logged write may be a write to one or some of the items, but not all items, in some embodiments.

Please note, FIG. 1 is provided as a logical illustration of a datastore, one or more read replica nodes, and a primary write node is not intended to be limiting as to the physical arrangement, size, or number of components, modules, or devices to implement such features. For example, only a single primary write node might be implemented, or multiple write nodes might be implemented. In some embodiments, the database data 115 at the datastore 110 may be distributed across many different storage nodes.

The specification next describes an example of a database system as a network-based database service that stores data for a database managed by the database service in a separate data storage service, according to various embodiments. Included in the description of the example network-based database service are various aspects of the example network-based database service along with the various interactions between the database service and the storage service, including interactions to perform multi-level replication filtering for a distributed database according to some embodiments. The specification then describes a flowchart of various embodiments of methods for implementing multi-level replication filtering for a distributed database. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process. In some embodiments, as discussed below with regard to FIGS. 2-4, conflict detection in order to support multiple writers to a database may be implemented.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain much of the structure of the upper half of the database instance (e.g., query processing and query optimization) but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a database object, altering a database object, creating a user, dropping a user, inserting one or more rows in a database object, copying values, selecting data from within a database object (e.g., querying an object), canceling or aborting a query, creating a snapshot, and/or other operations, in some embodiments.

In some embodiments, the database tier of a may include one or multiple a database engine head node servers that receive read and/or write requests from various client programs (e.g., applications) and/or subscribers (users), then parse them and develop a plan to carry out the associated database operation(s). In some embodiments, the database engine head node may manage communications between the database tier of the database system and clients/subscribers, as well as communications between the database tier and a separate distributed storage system.

In some embodiments, a database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system, in some embodiments. In some embodiments, a client-side driver for the distributed storage system may be hosted on the database engine head node and may be responsible for routing redo log records to the storage system node (or nodes) that store the segments (or data pages thereof) to which those redo log records are directed.

For example, in some embodiments, each segment may be mirrored (or otherwise made durable) on multiple storage system nodes that form a protection group, in some embodiments. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum that does not indicate that the transaction conflicts with other writes or transactions in storage from another writer. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. A data page held in this cache may not ever be flushed to the storage layer, and it may be discarded at any time (e.g., at any time after the redo log record for a write request that was most recently applied to the cached copy has been sent to the storage layer and acknowledged), in some embodiments. The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage. Instead, cache invalidation communications may be sent between multiple to writers to indicate changes to data which may result in the invalidation of a page in the cache of another writer at another node, in some embodiments. For example, in some embodiments, the client-side driver of one database engine head node may notify the client-side driver in other database engine head nodes about updates and/or invalidations to cached data pages (e.g., in order to prompt them to invalidate their caches, after which they may request updated copies of updated data pages from the storage layer).

In some embodiments, the client-side driver running on a database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained), in some embodiments. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client-side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may determine the one or more nodes that are implementing the storage for the targeted data page, and to route the redo log record(s) specifying that change to those storage nodes. The storage nodes may then be responsible for applying the change specified in the redo log record to the targeted data page at some point in the future if the change is identified as committed.

As writes are acknowledged back to the client-side driver, indications of whether the writes conflict with other writes received from other writers may be included. If, for instance, the indications acknowledge that the write was received but also acknowledge that the write conflicts, then a resolution of the conflict may need to be obtained from a primary database engine head node before the write can be committed (or cancelled). As writes are committed, the client-side driver may advance the point at which the volume is durable and may acknowledge commits back to the database tier, in some embodiments. As previously noted, in some embodiments, the client-side driver may not ever send data pages to the storage node servers. This may not only reduce network traffic, but may also remove the need for the checkpoint or background writer threads that constrain foreground-processing throughput in previous database systems; In other embodiments data pages could be exchanged between database engine head nodes and a data store while implementing optimistic concurrency for a multi-writer database.

In some embodiments, many read requests may be served by a database engine head node cache. However, write requests may require durability, since large-scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
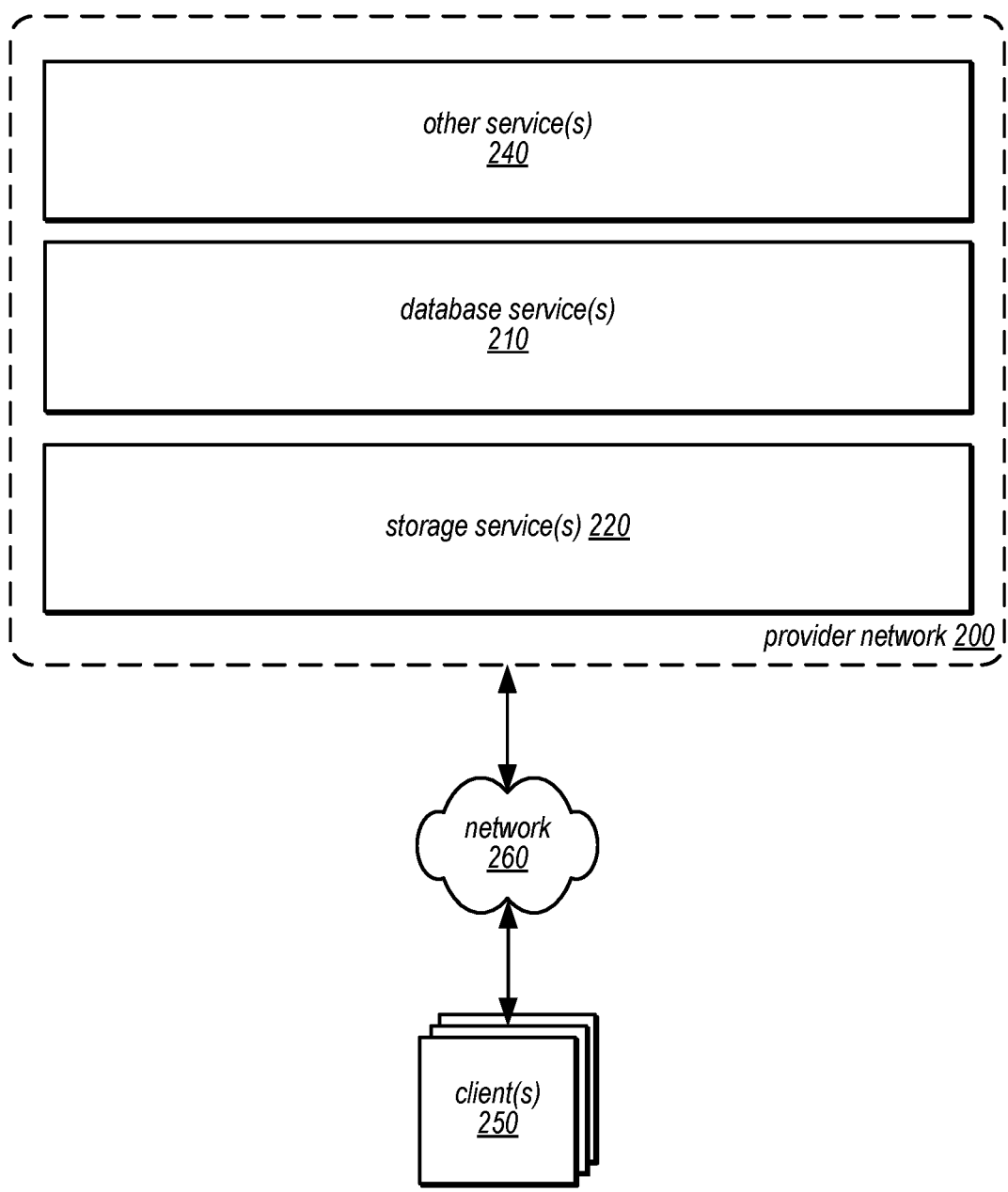
FIG. 2 is a logical block diagram illustrating a provider network that implements a database service, and separate storage service that implements multi-level replication filtering for a distributed database, according to some embodiments.

FIG. 2 is a logical block diagram illustrating a provider network that implements a database service, and separate storage service that implements multi-level replication filtering for a distributed database, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 800 described below with regard to FIG. 8), needed to implement and distribute the infrastructure and services offered by the provider network 200.

In some embodiments, provider network 200 may implement various network-based services, including database service(s) 210, a storage service(s) 220, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. Storage service(s) 220 may include many different types of data stores, including a log-structured storage service or other storage services as discussed below with regard to FIGS. 3 and 4, in some embodiments and may store database data.

Clients 250 may access these various services offered by provider network 200 via network 260. Likewise, network-based services may themselves communicate and/or make use of one another to provide different services. For example, storage service 220 may store data for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to perform a transaction to a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 240 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 240 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other processing service 240, in one embodiment.

Figure 3:
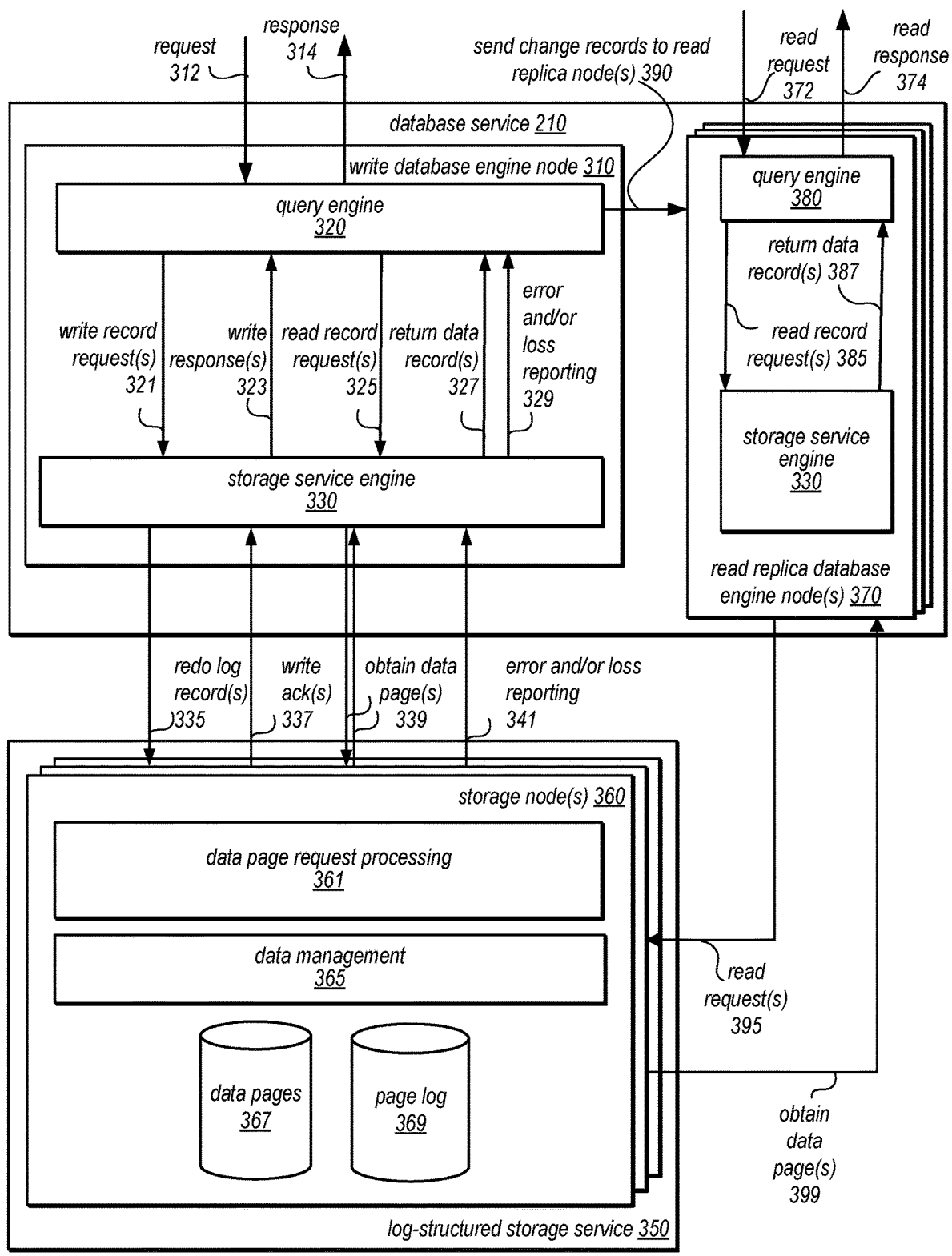
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a write database engine node 310 and a read replica database engine node or nodes 370 may be implemented for each of several databases and a log-structured storage service 350 (which may or may not be visible to the clients of the database system). Clients of a database may access the write database engine node 310 or read replica database engine node(s) 370 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a write database engine node 310 or read replica database engine node(s) 370.

As previously noted, a database instance may include a write database engine node 310 and/or read replica database engine node(s) 370, that each implements a query engine (320 and 380 respectively) that receives requests, like request 312 and read request 372. Requests may include queries or other requests such as requests to perform transactions that include updates, deletions, reads, etc., from various client programs (e.g., applications) and/or subscribers (users). The query engine 320, 380 parses the requests, optimizes them, and develops a plan to carry out the associated database operation(s). Query engine 320, 380 may return a response 314 or read response 374 to the request (e.g., results to a query or acknowledgement of a transaction as committed or indication of a transaction as failed) to a database client, which may include acknowledgements, requested data, error messages, and or other responses, as appropriate. As illustrated in this example, write database engine node 310 and read replica database engine node(s) 370 may also include a storage service engine 330 (or client-side driver), which may route read requests 395 and/or redo log records 335 to various storage nodes 360 within log-structured storage service 350, receive write acknowledgements 337 from log-structured storage service 350, receive requested data pages 339, 399 from log-structured storage service 350, and/or return data pages, error messages, or other responses 341 to query engine 320 (which may, in turn, return them to a database client).

In this example, query engines 320, 380 (or another database system management component implemented at write database engine node 310 or read replica database engine node(s) 370 (not illustrated)) may manage a data page cache, in which data pages that were recently accessed may be temporarily held. Query engine 320, 380 may be responsible for providing transactionality and consistency in the database instance of which write database engine node 310 and read replica database engine node(s) 370 are components. For example, query engine 320, 380 may be responsible for ensuring the Atomicity, Consistency, and Isolation properties of the database instance and the transactions that are directed that the database instance, such as determining a consistent view of the database applicable for a query, applying undo log records to generate prior versions of tuples of a database from dirty tuples received from storage nodes. Query engine 320, 380 may manage an undo log to track the status of various transactions and roll back any locally cached results of transactions that do not commit.

FIG. 3 illustrates various interactions to perform various requests, like request 312 and read request 372. For example, a request 312 that includes a transaction to update the database (e.g., one or more requests to write to page(s)) may be parsed and optimized by the query engine 320 to generate one or more write record requests 321, which may be sent to storage service engine 330 for subsequent routing to log-structured storage service 350. The query engine can also send change records 390 to one or more read replica database engine nodes 370. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) write database engine node 310 (specifically to storage service engine 330). Storage service engine 330 may pass these write acknowledgements to the query engine 320 (as write responses 323), which may then send corresponding responses (e.g., write acknowledgements) to one or more client clients as a response 314.

In another example, a request that is a query may cause data pages to be read and returned to query engine 320 or 380 for evaluation and processing may be performed. For example, a request 312 to write database engine node 310, or read request 372 to a read replica database engine node 370 could cause one or more read record requests 325 or 385, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339, 399 to the requesting node, either the write database engine node 310 or the read replica database engine node(s) 370 (specifically to storage service engine 330 of those nodes). Storage service engine 330 may send the returned data pages to query engine 320, 380 as return data records 327 or 387, and query engine may then evaluate the content of the data pages in order to determine or a generate a result of a query sent as a response 314 or read response 374.

Figure 4A:
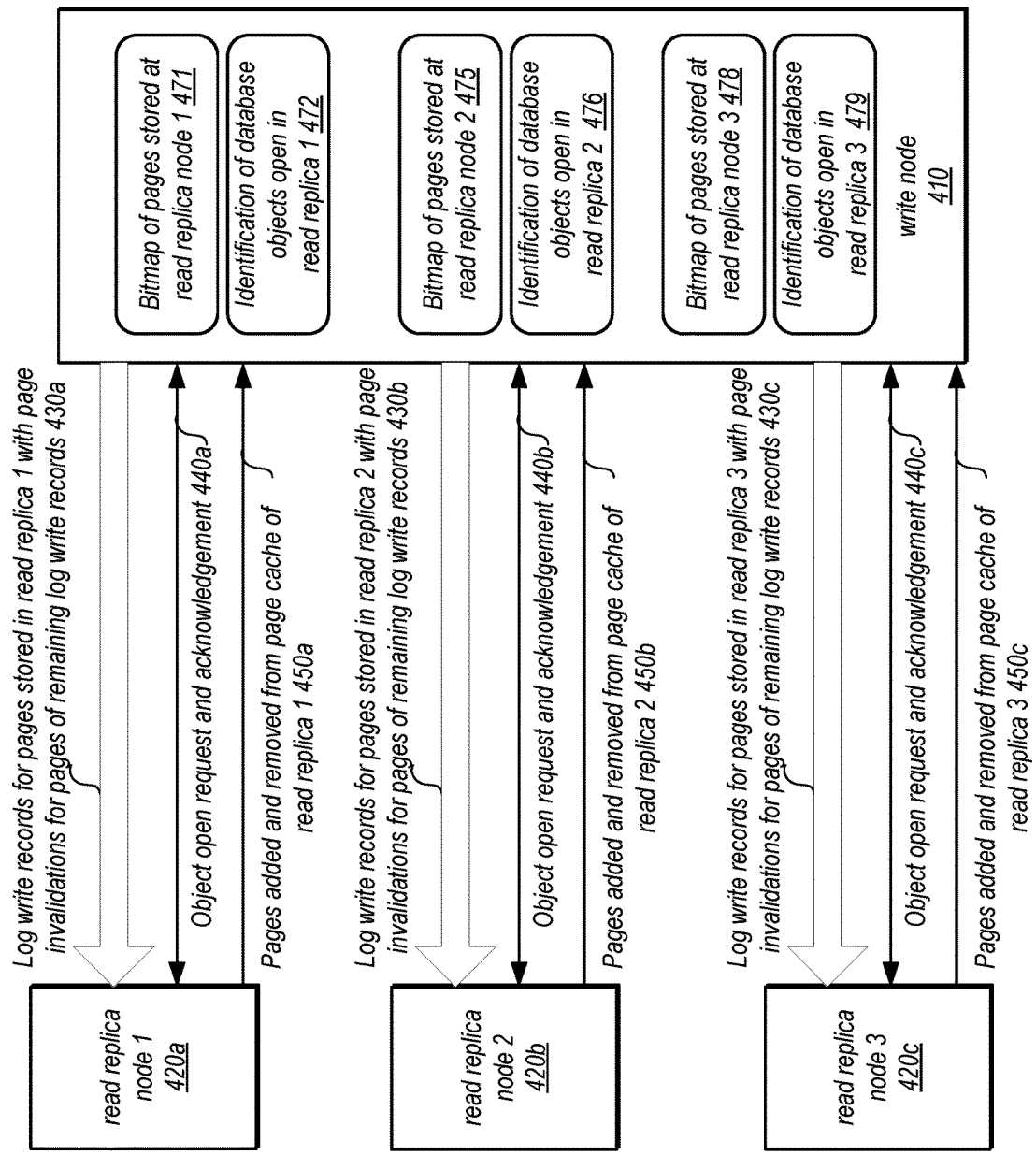
FIGS. 4A and 4B are block diagrams illustrating interactions between read replica nodes and one or more writers to a same database, according to some embodiments.

As discussed below with regard to FIGS. 4-6, query engine 320 (or another component of write database engine node 310 (not illustrated)) may generate change indications as part of a change data capture feature enabled for a database, store the change indications in memory, and send 390 directly from memory the change data records to one or more of the read replica database engine node(s) 370. As discussed below with regard to FIGS. 4A and 4B, the change records sent are in accordance with multi-level replication filtering for a distributed database.

In some embodiments, various error and/or data loss messages 341 may be sent from log-structured storage service 350 to write database engine node 310 (specifically to storage service engine 330). These messages may be passed from storage service engine 330 to query engine 320 as error and/or loss reporting messages 329, and then to one or more clients as a response 314.

In some embodiments, the APIs of log-structured storage service 350 and the APIs of storage service engine 330 may expose the functionality of the log-structured storage service 350 to write database engine node 310 or read replica database engine node(s) 370 as if write database engine node 310 or read replica database engine node(s) 370 were a client of log-structured storage service 350. For example, write database engine node 310 or read replica database engine node(s) 370 (through storage service engine 330) may write redo log records or request data pages through these APIs to perform (or facilitate the performance of) various operations of the database system implemented by the combination of write database engine node 310 or read replica database engine node(s) 370 and log-structured storage service 350 (e.g., storage, access, change logging, recovery, and/or space management operations).

Note that in various embodiments, the API calls and responses between write database engine node 310 or read replica database engine node(s) 370 and log-structured storage service 350 and/or the API calls and responses between storage service engine 330 and query engine 320, 380 in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with write database engine node 310 or read replica database engine node(s) 370 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages responsive to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Various communications may be implemented between nodes in order to implement multi-level replication filtering for a distributed database. FIGS. 4A and 4B are block diagrams illustrating interactions between read replica nodes and one or more writers to a same database, according to some embodiments. There are many ways in which multi-level replication filtering for a distributed database can be implemented, depending on the embodiment. In some embodiments, log records can be sent from a writer node(s) to read replica nodes, and the read record nodes can apply these log records to its cache. In some of these embodiments, log records can be sent from a primary writer node to a secondary write node, and the secondary write node can apply these log records to its cache. As shown in FIGS. 4A and 4B, write node 410 or primary write node 411 sends log write records for pages stored in read replica 1 430a to read replica node 1 420a, log write records for pages stored in read replica 2 430b to read replica node 2 420b. In FIG. 4A write node 410 sends log write records for pages stored in read replica 3 430c to read replica node 3 420c, while in FIG. 4B primary write node 411 sends log write records for pages stored in secondary write node 3 431 secondary write node 3 425.

In some embodiments, a write node 410 can know what set of pages are present in one or more of the read replicas. In some of these embodiments, a primary write node 411 can also know what set of pages are present in one or more of the secondary write nodes. For example, the database system might consistently maintain the state for the set of pages in each node's cache. Some of the nodes, such as the read replicas nodes 420a, 420b, and 420c, or secondary write node 425, might send updates of what pages are present in their cache to other nodes, such as write node 410 or primary write node 411. As shown in FIGS. 4A and 4B, read replica node 1 420a sends pages added and removed from its own page cache 450a to write node 410 or primary write node 411, and read replica node 2 420b sends pages added and removed from its own page cache 450b to write node 410 or primary write node 411. In FIG. 4A read replica node 3 420c sends pages added and removed from its own page cache 450c to write node 410, while in FIG. 4B secondary write node 3 425 sends pages added and removed from its own page cache 451 to primary write node 411.

This information can be sent between the nodes by piggybacking on other messages, such as empty replication requests, in some embodiments. The information can be relayed to a writer(s) 413 and 415 that might be responsible for sending the appropriate log records out, in some embodiments. The information might be sent on startup, and updated periodically, depending on the embodiment. For example, a read replica, such as read replica nodes 1, 2, or 3 (420a, 420b, and 420c), or secondary write node 425, might send out the list of pages that it has in its cache initially at startup, and then can keep those pages updated going forward. Then when a write node, or a primary node, receives this information, it only needs to send records regarding the pages which a node retains in its cache.

In some embodiments, the information regarding the pages in a read replica's cache can be encoded in a bitmap. This bitmap might have one bit that represents a page of the database, for example, such that the entirety of bits of the bitmap represents the entirety of pages of the database. This bitmap can be compressed, or treated as a sparsely populated data structure, using appropriate algorithms and techniques for those data structures, depending on the embodiment. The information regarding the pages in a node's cache might be represented using different mechanisms than a bitmap, and the description of a bitmap is not intended to be limiting. The entire encoding, such as the entire bitmap, can be relayed once upon node startup, or near in time to node startup, in some embodiments, as shown in 450a, 450b, 450c (FIG. 4A), and 451 (FIG. 4B). The write node 410 or primary write node 411 can store this bitmap as part of its state for the read replica nodes, or the secondary write nodes. For example, write node 410 (and primary write node 411) includes a bitmap of pages stored at read replica node 1 471, a bitmap of pages stored at read replica node 2 475. Write node 410 also includes and a bitmap of pages stored at read replica node 3 478, while primary write node 411 includes a bitmap of pages stored at secondary write node 3 473. The encoding, such as the bitmap, can be kept updated, in some embodiments. For example, the encoding on write node 410, or primary write node 411, can be updated when a new page is read or evicted from the cache of one of the read replica nodes, in some embodiments, as shown in 450a, 450b, 450c (FIG. 4A), and 451 (FIG. 4B). This can be performed in an asynchronous manner, in some of these embodiments. The updated information can piggy backed on a replication-read-request to the writer and/or the primary node, for example.

In addition to, or instead of, page-level filtering, database object-level filtering can be implemented, in some embodiments. As stated previously, a database object can be, for example, user data, or application data, or database metadata, or data descriptive of the workings of the database system such as undo logs or database dictionaries. In some preferred embodiments, a database object can be a table or a partition of a table. If the nodes of a distributed database never actually access the same database object of a distributed database, then there is no reason to send anything from the database object at all, in some embodiments. Database object-level filtering can prevent the sending of many unnecessary invalidation log records which would have needed to be processed by the other nodes, such as by the replication applicator in other nodes. Database object-level filtering can build from page-level filtering and can filter any log record, and even any invalidation record, for any database objects that the replica node does not have in its cache, in some embodiments. In other embodiments, database object-level filtering might be implemented without page-level filtering in order to filter log records for any database objects that a replica node does not have in its cache.

Database object-level filtering can be implemented in various ways, depending on the embodiments. In some embodiments, database object-level filtering can be implemented synchronously. The write node 410 or primary write node 411 can maintain the state of which database objects are open in which nodes, in some embodiments. For example, write node 410 or primary write node 411 includes an identification of database objects open in read replica 1 472, and an identification of database objects open in read replica 2 476. Write node 410 also includes an identification of database objects open in read replica 3 479, while primary write node 411 includes an identification of database objects open in secondary write node 3 474.

Each node needs to synchronously register with the writer or primary node and wait for its response before the database object can be opened, in some of these embodiments. For example, read replica node 1 420*a* communicates with the write node 410 (or primary write node 411) to send a database object open request and receive a database object open acknowledgement 440*a*, read replica node 2 420*b* communicates with the write node 410 (or primary write node 411) to send a database object open request and receive a database object open acknowledgement 440*b*, and read replica node 3 420*c* communicates with the write node 410 to send a database object open request and receive a database object open acknowledgement 440*c*. In addition, in FIG. 4B secondary write node 3 425 communicates with the primary write node 411 to send a database object open request and receive a database object open acknowledgement 441. The write node 410 (or primary write node 411) only sends log records for those pages which belong to open database objects in the read replica nodes (or secondary write nodes), in these embodiments. In these embodiments, network bandwidth can be saved, but at cost of slower performance for opening a database object (since it involves a network round-trip).

More specifically, when a node wants to open a database object, a node has to register the opening of a database object with a globally present registry, in some embodiments. In the embodiments shown in FIGS. 4A and 4B, this registry is included in the write node 410 or primary write node 411. This registry 472, 476, 479 (FIG. 4A), and 474 (FIG. 4B) can keep the state of what database objects are open in what nodes, in some of these embodiments. The node that opens the database object then waits for a response from the registry acknowledging that the database object is open, in some embodiments, as shown in 440*a*, 440*b*, 440*c* (FIG. 4A), and 441 (FIG. 4B). In some embodiments, the node might receive a log sequence number ("LSN") from which the database object is ready to be opened. The LSN can be a point in a stream that is being sent from the writer or primary node to the replica, in some embodiments. The node opening a database object should wait until it receives the LSN before it can open the database object for accesses, in some of these embodiments.

The write node 410 or primary write node 411 can, in some embodiments, filter the log records from the stream based on the maintained state for the read replica nodes 420*a*, 420*b*, and 420*c*. In addition, primary write node 411 can, in some embodiments, filter the log records from the stream based on the maintained state for the secondary write node 425. This maintained state can be a bitmap of pages stored at read replica nodes 1, 2, and 3 (471, 475 and 478) (or a bitmap of pages stored at a secondary write node 473) if the system is implementing page-level filtering, and/or the identification of database objects open in read replicas 1, 2, and 3 (472, 476 and 479) (or the identification of database objects open in secondary write node 474) if the system is implementing database object-level filtering. The write node 410 or primary write node 411 removes those log records from the stream of log records, such as a WAL, to be sent to the read replica nodes. This is shown in log write records for pages and/or database objects stored in read replica 1 430*a* that is sent to read replica node 1 420*a*, log write records for pages and/or database objects stored in read replica 2 430*b* that is sent to read replica node 2 420*b*, log write records for pages and/or database objects stored in read replica 3 430*c* that is sent to read replica node 3 420*c* in FIG. 4A, and log write records for pages and/or database objects stored in secondary write node 3 431 that is sent to read replica node 3 425 in FIG. 4B. A node (such as a read replica nodes 420*a*, 420*b*, and 420*c*, and secondary write node 425) receiving log records would then only apply the filtered log records it receives to the data in its cache, such as its buffer cache. A node would probably not receive log records that do not apply to its cache, in some of these embodiments, and therefore extraneous log records do not need to consume unnecessary network bandwidth.

The node that sends the log records, whether it be write node 410 (or primary write node 411), can access the registry 472, 476, 479 (in FIG. 4A), and 474 (in FIG. 4B) and see what database objects are open in a particular read replica node or secondary write node, in some embodiments. This sending node can access the LSN for a particular database object and know that log records regarding the database object, with an LSN after the accessed LSN from the registry, need to be sent to the particular node or nodes that have that database object opened. Therefore, log records are sent to node that has the database object opened as of the LSN in which the database object was opened, in some of these embodiments. The node with the database object opened doesn't actually access the database object until it has received the LSN from the registry, making the database object accesses consistent.

Only sending log records to nodes for pages which the stored state of a writer and/or primary node indicates is in that particular node's cache, however, might lead to consistency problems, in some embodiments. For example, there can be races between a read replica loading a page and a write and/or primary node not sending log records to the read replica for that page. The write and primary node might think that the particular read replica does not have a particular page, and therefore will not send a log record for that particular page to that particular read replica, in this example. In the meanwhile, the particular read replica might load that particular page from storage, and start accessing the data from that page. The read replica would never know about the log record to be applied to that page, and so would never apply that log record to its loaded page, and therefore the read replica would have inconsistent data, causing inconsistency throughout the entire distributed database.

In order to solve this problem and maintain consistency across the nodes of a distributed database, including the read replica nodes, write node 410 or primary write node 411 can send invalidation log record to the read replica nodes, in some embodiments. The write node 410 or primary write node 411 adds an invalidation record in-place of the filtered log record to the stream. For example, write node 410 or primary write node 411 sends invalidations for pages of remaining log write records for read replica 1 430*a* to read replica node 1 420*a*, invalidations for pages of remaining log write records for read replica 2 430*b* to read replica node 2 420*b*. In addition, write node 410 sends invalidations for pages of remaining log write records for read replica 3 430*c* to read replica node 3 420*c*, and primary write node 411 sends invalidations for pages of remaining log write records for read replica 3 431 to secondary write node 3 425.

The invalidation record is a special log record that does not have the entirety of the information about the set of changes that are to be applied to a particular page. Instead, the invalidation record, in some embodiments, simply tells whether a page is to be invalided or not, only contains the page to invalidate, and is therefore a couple of times smaller in size compared to the actual log record. An invalidation can essentially means an eviction of the page from the buffer pool of the node that receives the invalidation record, in some embodiments. This invalidation record is required, in some embodiments, to prevent race conditions when the replica node reads the page from shared storage into cache while the writer is filtering out the log records.

Figure 4B:
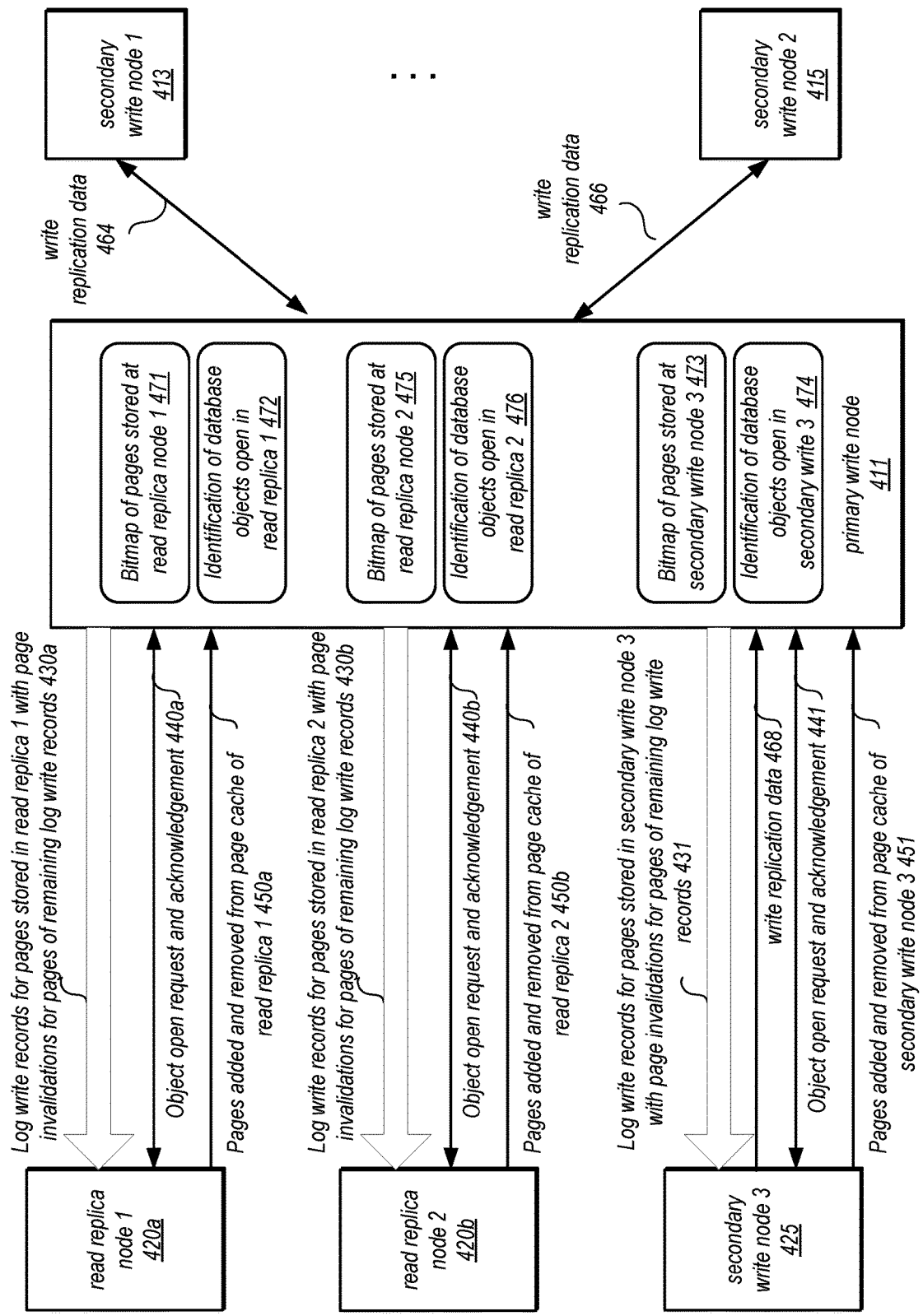
Figure 5:
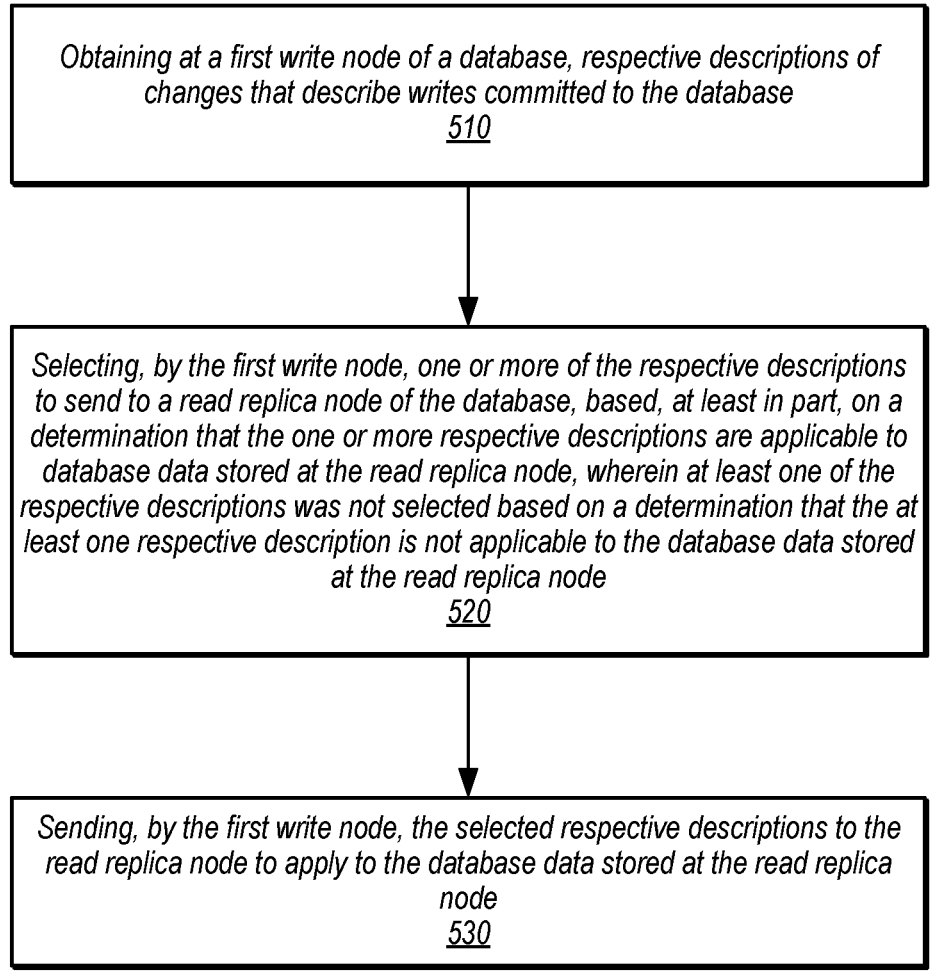
FIG. 5 is a high-level flow chart illustrating methods and techniques for multi-level replication filtering for a distributed database, according to some embodiments.

FIG. 4B further shows a system with multiple write nodes. The system includes the primary write node 411, along with multiple secondary write nodes 413, 415, and 425. In some embodiments, some or all of the secondary write nodes send write replication data 464, 466, 468 to the primary write node. In some embodiments, the secondary write nodes receive write replication data from the primary node 464, 466 for writes that occurred at one of the other write nodes. This write replication data can include the redo log records 335 discussed with regard to FIG. 3. The primary write node 411 can coordinate the log records of the writes to the database, can perform the filtering of the log records for the read replica nodes, and can send log write records for pages and/or database objects stored in the individual read replica nodes, along with page invalidations for pages of remaining log write records (430*a*, 430*b*) not known to be stored in the individual read replica node.

In addition, in some embodiments, instead of sending a complete amount of write replication data to a secondary write node, the primary write node 411 can treat some or all of the secondary write nodes as essentially read replica nodes for the purposes of sending write replication data. In these embodiments, shown in regard to the interface between primary write node 411 and secondary write node 425, the primary write node performs the filtering of the log records for some or all of the secondary write nodes, such as secondary write node 425, and can send log write records for pages and/or database objects stored in the individual secondary write nodes, along with page invalidations for pages of remaining log write records 431 not known to be stored in the secondary write node. In addition, a secondary write node can send a database object open request and receive back an acknowledgement 441, and can send pages added and/or removed from its page cache 451 to the primary write node, as discussed previously. The secondary write node can also send write replication data 468 to the primary write node 411 for the data that it wrote to the database.

Although not shown in FIG. 4B, a secondary write node might also communicate directly with a read replica node, using the same type of interface and communication as has been described between primary write node 411 and read replica nodes 420*a* and 420*b*, in some embodiments. The secondary write node would then include a data structure (such as a bitmap) of pages stored at the corresponding read replica node, if the secondary write node was implementing page level filtering, in some of these embodiments. If the secondary write node was implementing database object-level filtering instead of or in addition to the page level filtering, then the secondary write node would include an identification of the database objects open in the corresponding read replica node. If the primary write node 411 was also implementing page and/or object-level filtering with respect to that secondary write node (such as 425) that was communicating directly with the corresponding read replica node (not shown in FIG. 4B), then the primary write node 411 would need to include the corresponding read replica node's open pages and/or open database objects in its bitmap of pages stored at the secondary write node and/or its identification of database objects stored in the secondary write node, in addition to the secondary write node's stored pages and/or open database objects.

The database service and storage service discussed in FIGS. 1 through 4 provide examples of a system that may perform multi-level replication filtering for a distributed database. However, various other types of database systems or storage systems may implement multi-level replication filtering for a distributed database. FIG. 5 is a high-level flow chart illustrating methods and techniques for multi-level replication filtering for a distributed database, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

The flowchart begins at block 510 which obtains, at a first write node of a database, respective descriptions of changes that describe writes committed to the database. The flowchart then transitions to block 520 which selects, by the first write node, one or more of the respective descriptions to send to a read replica node of the database, based, at least in part, on a determination that the one or more respective descriptions are applicable to database data stored at the read replica node, wherein at least one of the respective descriptions was not selected based on a determination that the at least one respective description is not applicable to the database data stored at the read replica node. Then the flowchart transitions to block 530 which sends, by the first write node, the selected respective descriptions to the read replica node to apply to the database data stored at the read replica node.

Figure 6:
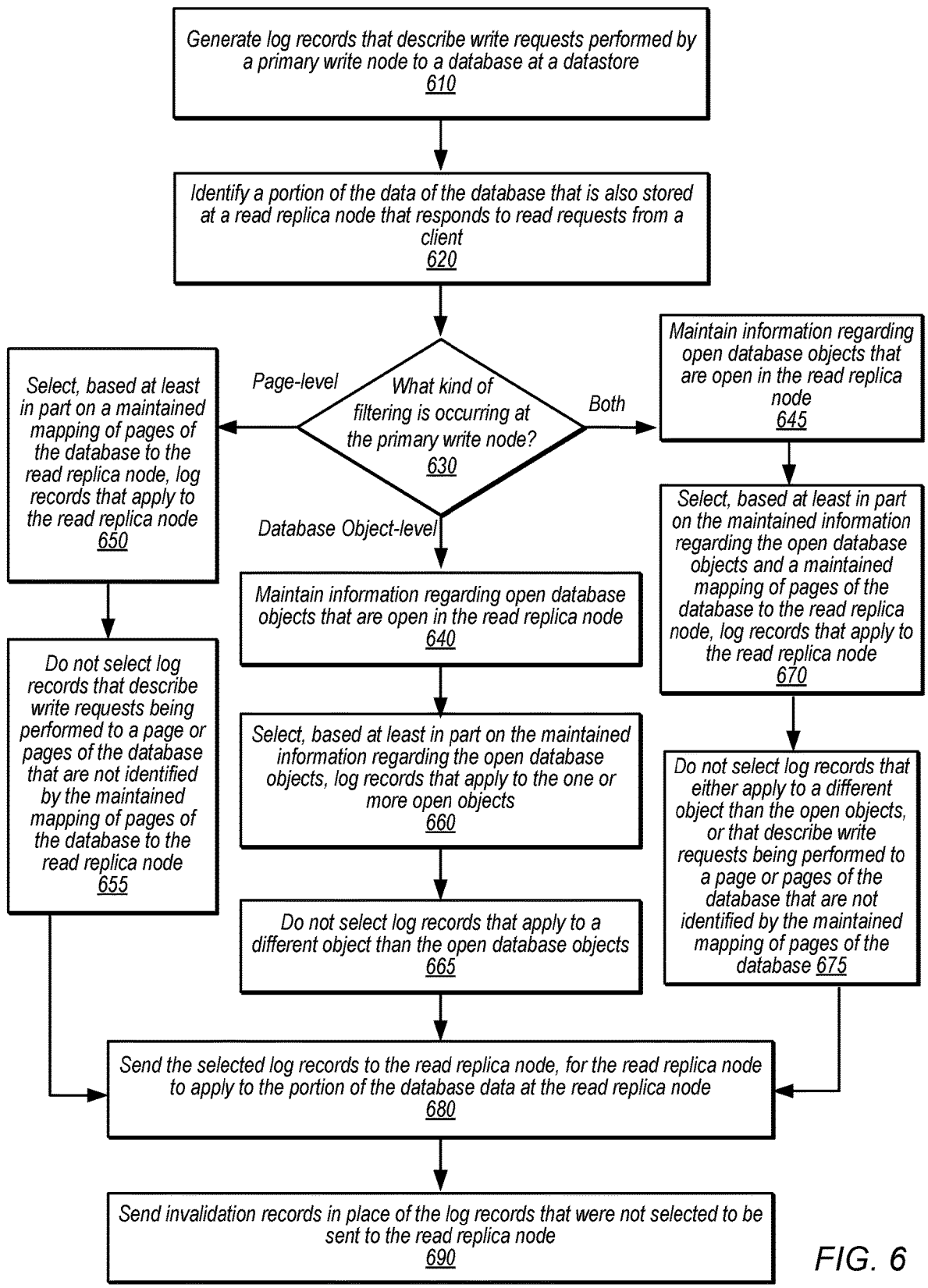
FIG. 6 is a high-level flow chart illustrating methods and techniques for sending appropriate log records to read replica nodes by a primary node in a system that performs multi-level replication filtering for a distributed database, according to some embodiments.

FIG. 6 is a high-level flow chart illustrating methods and techniques for sending appropriate log records to read replica nodes by a primary node in a system that performs multi-level replication filtering for a distributed database, according to some embodiments. The flowchart begins at block 610 which generates log records that describe write requests performed by a primary write node to a database at a datastore. The flowchart transitions to block 620 that identifies a portion of the data of the database that is also stored at a read replica node that responds to read requests from a client. The flowchart then determines what kind of filtering is occurring at the primary write node at decision block 630. Decision block 630 determines whether page-level filtering, database object-level filtering, or both page-level and database object-level filtering is occurring at the primary write node.

If page-level filtering is occurring at the primary write node, then the flowchart transitions to 650 which selects, based at least in part on a maintained mapping of pages of the database to the read replica node, log records that apply to the read replica node. The flowchart then transitions to 655 which does not select log records that describe write requests being performed to a page or pages of the database that are not identified by the maintained mapping of pages of the database to the read replica node. If database object-level filtering is occurring at the primary write node, then the flowchart transitions to 640 which maintains information regarding open database objects that are open in the read replica node. It then selects, based at least in part on the maintained information regarding the open database objects, log records that apply to the one or more open database objects at block 660. Block 665 then does not select log records the apply to a different database object than the open database objects. If both page-level and database object-level filtering is occurring at the primary write node, then the flowchart transitions to block 645 maintains information regarding open database objects that are open in the read replica node. Then the flowchart selects, based at least in part on the maintained information regarding the open database objects and a maintained mapping of pages of the database to the read replica node, log records that apply to the read replica node at block 670. The flowchart then transitions to block 675 which does not select log records that either apply to a different database object than the open database objects, or that describe write requests being performed to a page or pages of the database that are not identified by the maintained mapping of pages of the database.

All 3 paths that are branched from decision block 630 converge back at block 680 which sends the selected log records to the read replica node, for the read replica node to apply to the portion of the database data at the read replica node. Then the flowchart ends at block 690 which sends invalidation records in place of the log records that were not selected to be sent to the read replica node. The read replica node uses these invalidation records to invalidate stale pages that might be in its cache, which the primary write node is not yet aware of, in some embodiments.

Figure 7:
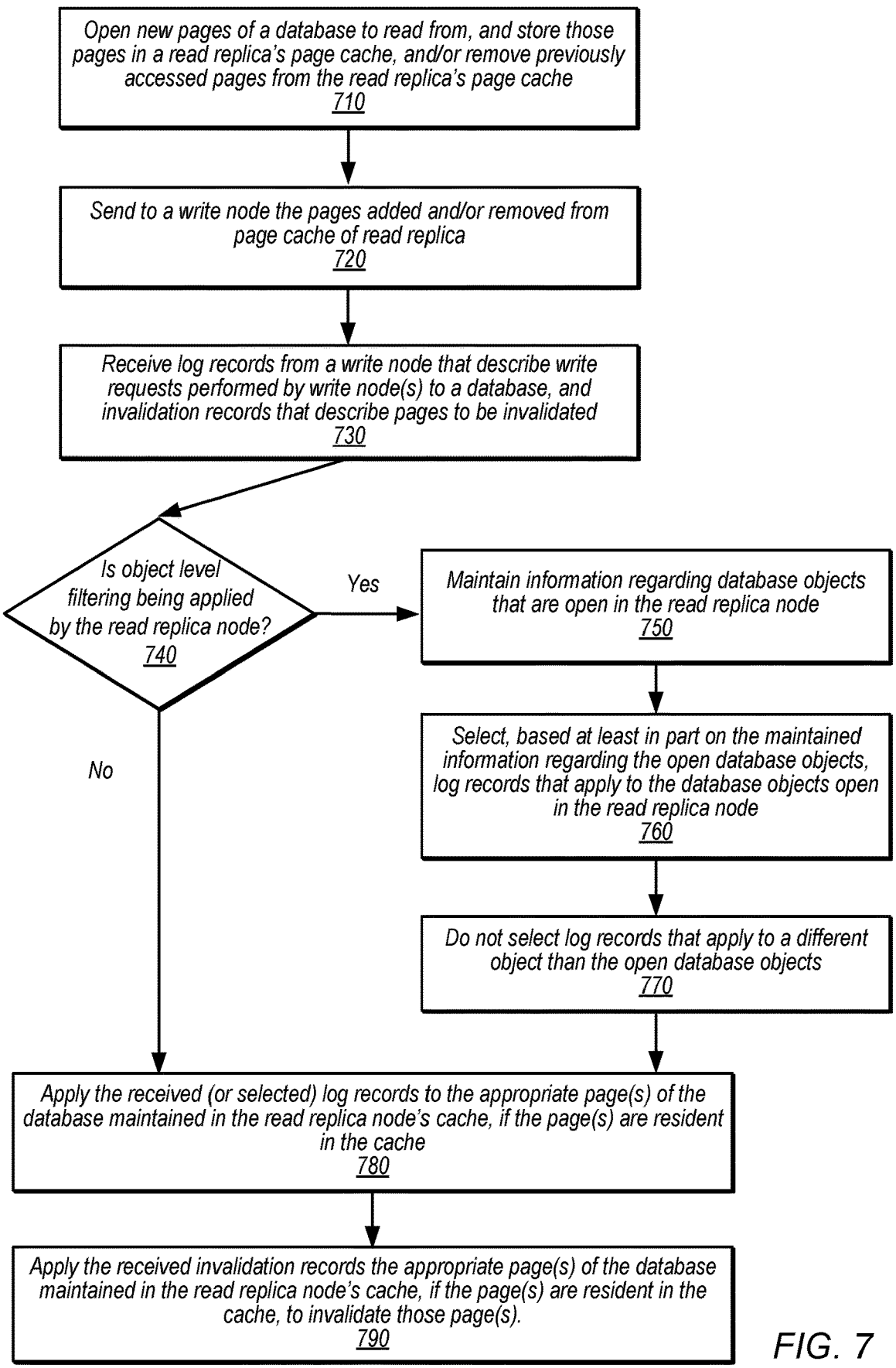
FIG. 7 is a high-level flow chart illustrating methods and techniques for receiving log records by read replica nodes from a primary node in a system that performs multi-level replication filtering for a distributed database, according to some embodiments.

FIG. 7 is a high-level flow chart illustrating methods and techniques for receiving log records by read replica nodes from a primary node in a system that performs multi-level replication filtering for a distributed database, according to some embodiments. The flowchart in FIG. 7 begins at block 710 which opens new pages of a database to read from, and stores those pages in a read replica replica's page cache, and/or removes previously accessed pages from the read replica replica's page cache. The read replica node then sends to a write node the pages added and/or removed from page cache of read replica node at block 730. The read replica node, at block 730, then receives log records from a write node that describes write requests performed by one or more write node(s) to a database, and invalidation records that describe pages to be invalidated at the read replica node.

The flowchart transitions to decision bock 740 which determines whether database object-level filtering is being applied by the read replica node or not. If database object-level filtering is being applied by the read replica node, then the flowchart transitions to block 750. If database object-level filtering is not being applied by the read replica node, then the flowchart jumps ahead to block 780. If database object-level filtering is being applied by the read replica node, block 750 maintains information regarding database objects that are open in the read replica node. Then the read replica node selects, based at least in part on the maintained information regarding the open database objects, log records that apply to the database objects open in the read replica node at block 760. The flowchart then transitions to block 770 that does not select log records that apply to a different database object than the open database objects.

Both paths from decision block 740 converge in block 780. In block 780, the read replica node applies the received (or selected) log records to the appropriate page(s) of the database maintained in the read replica node node's cache, if the page(s) are resident in the cache. The flowchart then transitions to the final block 790 that applies the received invalidation records the appropriate page(s) of the database maintained in the read replica node node's cache, if the page(s) are resident in the cache, to invalidate those page(s).

Figure 8:
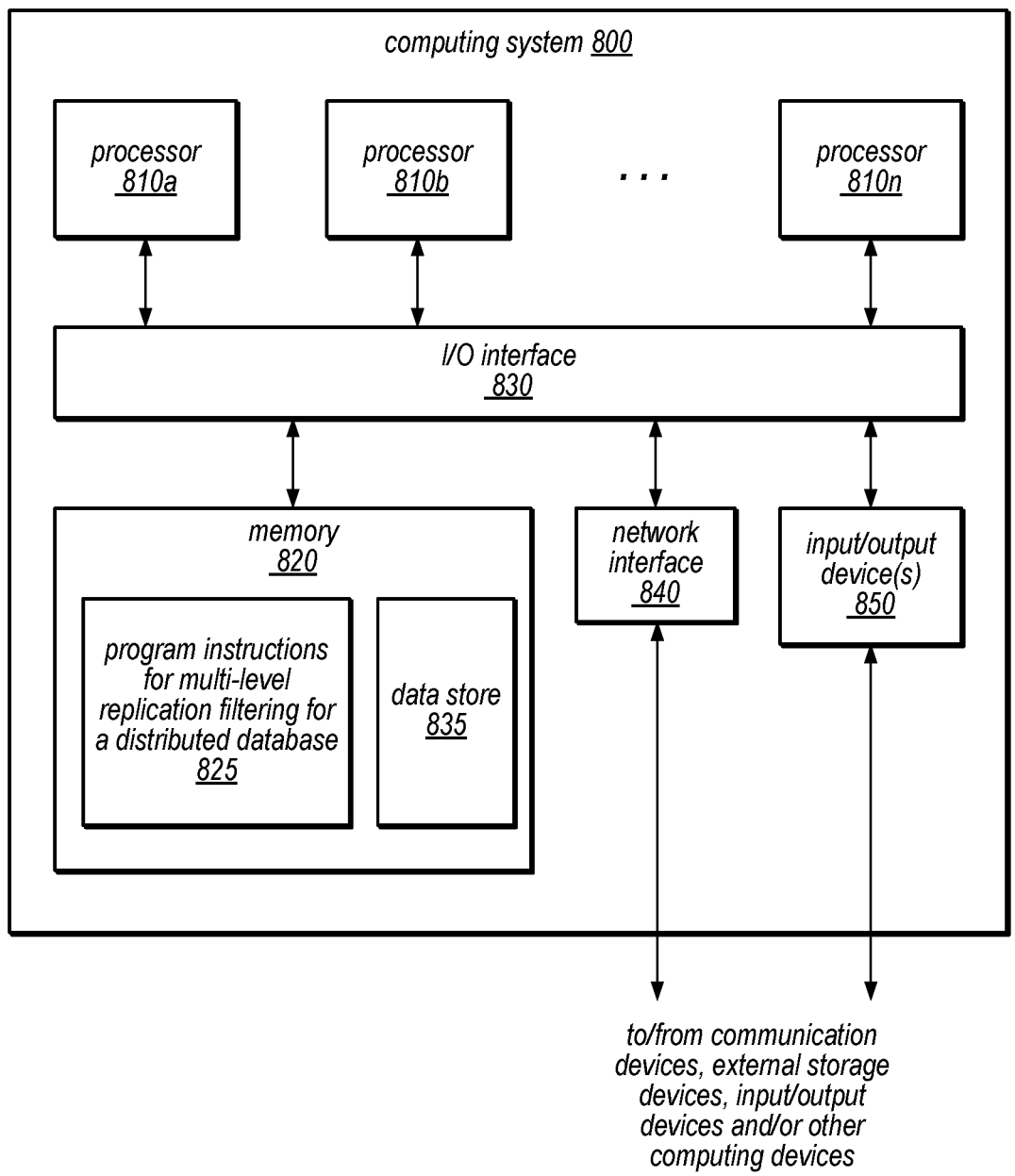
FIG. 8 is a block diagram illustrating an example computer system, according to some embodiments.

FIG. 8 is a block diagram illustrating an example computer system, according to some embodiments. For example, computer system 800 may implement a database engine head node of a database tier, or one of a plurality of storage nodes of a separate distributed storage system that stores databases and associated metadata on behalf of clients of the database tier, in different embodiments. Computer system 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 800 includes one or more processors 810 (any of which may include multiple cores, which may be single or multi-threaded) coupled to a system memory 820 via an input/output (I/O) interface 830. Computer system 800 further includes a network interface 840 coupled to I/O interface 830. In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 840 to communicate with a server application executing on a single server or on a cluster of servers that implement one or more of the components of the database systems described herein. In another example, an instance of a server application executing on computer system 800 may use network interface 840 to communicate with other instances of the server application (or another server application) that may be implemented on other computer systems.

In the illustrated embodiment, computer system 800 also includes one or more persistent storage devices and/or one or more I/O devices 850. In various embodiments, persistent storage devices may correspond to disk drives, tape drives, solid state memory, other mass storage devices, or any other persistent storage device. Computer system 800 (or a distributed application or operating system operating thereon) may store instructions and/or data in persistent storage devices, as desired, and may retrieve the stored instruction and/or data as needed. For example, in some embodiments, computer system 800 may host a storage system server node, and persistent storage may include the SSDs attached to that server node.

Computer system 800 includes one or more system memories 820 that store instructions and data accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement multi-level replication filtering for a distributed database. In various embodiments, program instructions 825 may be encoded in platform native binary, any interpreted language such as Java byte-code, or in any other language such as C/C++, Java, etc., or in any combination thereof. For example, in the illustrated embodiment, program instructions 825 include program instructions executable to implement the functionality of multi-level replication filtering for a distributed database, in different embodiments. In some embodiments, program instructions 825 may implement multiple separate clients, server nodes, and/or other components.

In some embodiments, program instructions 825 may include instructions executable to implement an operating system (not shown), which may be any of various operating systems, such as UNIX, LINUX, Solaris, MacOS, Windows, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include data store 835, as described herein. For example, the information described herein as being stored by the database tier (e.g., on a database engine head node), such as a transaction log, an undo log, cached page data, or other information used in performing the functions of the database tiers described herein may be stored in data store 835 or in another portion of system memory 820 on one or more nodes, in persistent storage, and/or on one or more remote storage devices, at different times and in various embodiments. Similarly, the information described herein as being stored by the storage tier (e.g., redo log records, coalesced data pages, and/or other information used in performing the functions of the distributed storage systems described herein) may be stored in data store 835 or in another portion of system memory 820 on one or more nodes, in persistent storage 860, and/or on one or more remote storage devices, at different times and in various embodiments. In general, system memory 820 (e.g., data store 835 within system memory 820), persistent storage, and/or remote storage may store data blocks, replicas of data blocks, metadata associated with data blocks and/or their state, database configuration information, and/or any other information usable in implementing the methods and techniques described herein.

In one embodiment, I/O interface 830 may coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may allow data to be exchanged between computer system 800 and other devices attached to a network, such as other computer systems (which may implement one or more storage system server nodes, database engine head nodes, and/or clients of the database systems described herein), for example. In addition, network interface 840 may allow communication between computer system 800 and various I/O devices 850 and/or remote storage. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a primary node comprising a first processor and a first memory, wherein the primary node performs write requests to a database;
a read replica node comprising a second processor and a second memory, wherein the read replica node performs read requests to the database;
a datastore that stores data for the database, wherein the datastore is accessible to both the primary node and the read replica node;
wherein the primary node is configured to:
generate respective log records that describe write requests performed by the primary node to the database at the datastore;
identify a portion of the data of the database that is also stored at the read replica node to perform the read requests;
select one or more of the respective log records to send to the read replica node that are applicable to the identified portion of the data, wherein at least one of the respective log records was not selected based on a determination that the at least one log record is not applicable to the identified portion of the data; and
send the selected log records to the read replica node for the read replica node to apply to the portion of the database data at the read replica node.

2. The system of claim 1, wherein the database comprises a plurality of pages that collectively contain the data of the database, wherein the respective log records describe write requests performed by the primary node to one or more of the pages of the database, and wherein to select the one or more of the respective log records to send to the read replica node that are applicable to the identified portion of the data of the database, the primary node is further configured to:
determine, based at least in part on a maintained mapping of the pages of the database to the read replica node, the one or more of the respective log records that apply to the read replica node; and
wherein the determination that the at least one log record is not applicable to the identified portion of the data of the database that is also stored at the read replica node further comprises:
a determination that the one or more of the pages of the database, to which the at least one log record describes write requests performed, are not identified by the maintained mapping of the pages of the database to the read replica node.

3. The system of claim 1, wherein the database comprises a plurality of database objects, wherein individual database objects of the plurality of database objects comprise a different subset of the data of the database, wherein the respective log records describe write requests performed by the primary node to individual database objects of the database, wherein the primary node is further configured to:
maintain information regarding one or more open database objects of the plurality of database objects that are open in the read replica node;
wherein to select the one or more of the respective log records to send to the read replica node that are applicable to the identified portion of the data of the database that is also stored at the read replica node, the primary node is further configured to:
select, based at least in part on the maintained information regarding the one or more open database objects, the one or more of the respective log records that apply to the one or more open database objects; and wherein the determination that the at least one log record is not applicable to the identified portion of the data of the database that is also stored at the read replica node further comprises:
a determination that the at least one log record applies to a different database object than the one or more open database objects.

4. The system of claim 1, wherein the primary node is further configured to:
send, to the read replica node, invalidation records in place of the at least one of the respective log records that was not selected to send to the read replica node.

5. The system of claim 1, wherein the first processor and second processor are implemented as part of a network-based database service that includes the primary node and read replica node that both provide access to the database for one or more clients, wherein the datastore is a log-based datastore that is a separate storage service, and wherein the one or more clients are clients of the network-based database service.

6. A method, comprising:
obtaining at a first write node of a database comprising database data, respective descriptions of changes that describe writes committed to the database;
selecting, by the first write node, one or more of the respective descriptions to send to a second node that performs requests to the database, based, at least in part, on a determination that the one or more respective descriptions are applicable to a portion of the database data stored at the second node, wherein at least one of the respective descriptions was not selected based on a determination that the at least one respective description is not applicable to the portion of the database data stored at the second node; and
sending, by the first write node, the selected respective descriptions to the second node to apply to the portion of the database data stored at the second node.

7. The method of claim 6, wherein the database comprises a plurality of pages that collectively contain the database data, wherein the respective descriptions of changes describe writes committed to one or more of the pages of the database, wherein the selecting, by the first write node, the one or more of the respective descriptions of changes to send to the second node of the database further comprises:
determining, based at least in part on a maintained mapping of at least some the pages of the database to the second node, the one or more of the respective descriptions of changes that apply to the second node; and
wherein the determination that the at least one respective description is not applicable to the portion of the database data stored at the second node further comprises:
a determination that the one or more of the pages of the database, to which the at least one respective description describes writes committed, are not identified by the maintained mapping of the at least some the pages of the database to the second node.

8. The method of claim 7, wherein the maintained mapping of the at least some the pages of the database to the second node is a bitmap that identifies whether individual pages of the at least some the pages of the database are maintained by the second node.

9. The method of claim 6, wherein the database comprises a plurality of database objects, wherein individual database objects of the plurality of database objects comprise a different subset of the database data, wherein the respective descriptions of changes describe writes committed to individual database objects of the database, wherein the method further comprises:
maintaining information regarding one or more open database objects of the plurality of database objects that are open in the second node;
wherein the selecting, by the first write node, one or more of the respective descriptions of changes to send to the second node of the database, based, at least in part, on the determination that the one or more respective descriptions are applicable to the portion of the database data stored at the second node further comprises:
selecting, based at least in part on the maintained information regarding the one or more open database objects that are open in the second node, one or more of the respective descriptions of changes that apply to the one or more open database objects, to send to the second node of the database; and
wherein the determination that the at least one respective description is not applicable to the portion of the database data stored at the second node further comprises:
a determination that the at least one respective description applies to a different database object than the one or more open database objects.

10. The system of claim 6, further comprising:
sending, to the second node, invalidation records in place of the at least one respective description that was not selected to send to the second node.

11. The method of claim 6, further comprising:
sending the respective descriptions of changes, that describe the writes committed to the database, to a datastore that stores the database data, wherein the datastore is accessible to both the first write node and the second node.

12. The method of claim 6 further comprising:
selecting, by the first write node, another one or more of the respective descriptions to send to a third node of the database, based, at least in part, on a determination that the other one or more respective descriptions are applicable to another portion of the database data stored at the third node; and
sending, by the first write node, the selected other one or more respective descriptions to the third node to apply to the other portion of the database data stored at the third node, wherein at least one of the other respective descriptions sent to the third node is different than any of the selected respective descriptions sent to the second node.

13. The method of claim 6 further comprising:
obtaining, at a second write node of the database, other respective descriptions of other changes that describe other writes committed to the database;
sending, by the second write node to the first write node, write replication data comprising the other respective descriptions of the other changes that describe the other writes committed to the database; and
sending, by the first write node, at least one of the other respective descriptions, along with the selected respective descriptions, to the second node to apply to the portion of the database data stored at the second node.

14. One or more non-transitory computer-readable storage media storing program instructions that when executed on or across one or more processors of a primary write node of a database, cause the one or more processors to:

generate respective descriptions of changes that describe writes committed to the database, wherein the database comprises database data;

select one or more of the respective descriptions of changes to send to a second node of the database, based, at least in part, on a determination that the one or more respective descriptions are applicable to a portion of database data stored at the second node, wherein at least one of the respective descriptions was not selected based on a determination that the at least one respective description is not applicable to the portion of the database data stored at the second node; and send the selected respective descriptions of changes to the second node.

15. The one or more non-transitory computer-readable storage media of claim 14, wherein the database comprises a plurality of pages that collectively contain the database data, wherein the respective descriptions of changes describe writes committed to one or more of the pages of the database, wherein to select the one or more of the respective descriptions of changes to send to the second node of the database, the program instructions further cause the one or more processors to:

determine, based at least in part on one or more probabilistic data structures, the one or more of the respective descriptions of changes that apply to the second node; and wherein the determination that the at least one respective description is not applicable to the portion of the database data stored at the second node further comprises:

a determination that the one or more of the pages of the database, to which the at least one respective description describes writes committed, are not identified by the one or more probabilistic data structures.

16. The method of claim 15, wherein the maintained mapping of the at least some the pages of the database to the second node is a bitmap that identifies whether individual pages of the at least some the pages of the database are maintained by the second node.

17. The method of claim 14, wherein the database comprises a plurality of database objects, wherein individual database objects of the plurality of database objects comprise a different subset of the database data, wherein the respective descriptions of changes describe writes committed to individual database objects of the database, wherein the program instructions, when executed on or across the one or more processors of the primary write node of the database, further cause the one or more processors to:

maintain information regarding one or more database objects of the plurality of database objects that are open in the second node;

wherein to select the one or more of the respective descriptions of changes to send to the second node of the database, based, at least in part, on the determination that the one or more respective descriptions are applicable to the portion of the database data stored at the second node, the program instructions further cause the one or more processors to:

select, based at least in part on the maintained information regarding the one or more open database objects that are open in the second node, one or more of the respective descriptions of changes that apply to the one or more open database objects, to send to the second node of the database; and wherein the determination that the at least one respective description is not applicable to the portion of the database data stored at the second node further comprises:

a determination that the at least one respective description applies to a different database object than the one or more open database objects.

18. The system of claim 14, wherein the program instructions, when executed on or across the one or more processors of the primary write node of the database, further cause the one or more processors to:

send, to the second node, invalidation records in place of the at least one respective description that was not selected to send to the second node.

19. The method of claim 14, wherein the program instructions, when executed on or across the one or more processors of the primary write node of the database, further cause the one or more processors to:

send the respective descriptions of changes, that describe the writes committed to the database, to a datastore that stores the database data, wherein the datastore is accessible to both the first write node and the second node.

20. The method of claim 14 the program instructions, when executed on or across the one or more processors of the primary write node of the database, further cause the one or more processors to:

select another one or more of the respective descriptions to send to a third node of the database, based, at least in part, on a determination that the other one or more respective descriptions are applicable to another portion of the database data stored at the third node; and send the selected other one or more respective descriptions to the third node to apply to the other portion of the database data stored at the third node, wherein at least one of the other respective descriptions sent to the third node is different than any of the selected respective descriptions sent to the second node.

* * * * *